INVENTORS
PETER N. CROCKETT
MATTHEW A. KRYGOWSKI
THOMAS S. STAFFORD

BY Robert Lieber

ATTORNEY

FIG. 10

READ OPERATION

| ANOTHER CHANNEL ROUTINE REQUEST ACTIVE? | CHANNEL QUEUE STATUS: LS POSITION ACCESSIBLE (NOTE 1) | LS POSITION STATUS (NOTE 1) | B REG STATUS | C REG STATUS | PRIORITY LEVEL OF READ ROUTINE REQUEST: 0 | 1 | 2 | READ TRANSFER ROUTINE EXECUTED BY COMMON CONTROLS IF CHANNEL REQUEST IS SERVICED: B→MS | B→LS | LS→MS | I/O STAT 3 FROM/TO |
|---|---|---|---|---|---|---|---|---|---|---|---|
| NO | NO | VACANT | VACANT | NOT FULL | NOTE 2 | | | | | | |
| | | VACANT | VACANT | FULL (NOTE 3) | ✓ (NOTE 4) | | ✓ (NOTE 4) | ✓ | | | RESET/RESET |
| | | VACANT | FULL | DONT CARE | ✓ (NOTE 4) | | ✓ (NOTE 4) | ✓ | | | RESET/RESET |
| | | FULL | VACANT | DONT CARE | | | ✓ | | | ✓ | SET/RESET |
| | | FULL | FULL | DONT CARE | | ✓ | ✓ | | | ✓ | SET/RESET |
| YES | YES | VACANT | VACANT | NOT FULL | NOTE 2 | | | | | | |
| | ↓ | VACANT | VACANT | FULL (NOTE 3) | ✓ (NOTE 4) | | ✓ (NOTE 4) | | ✓ (NOTE 4) | (NOTE 4) | (NOTE 4) |
| | ↓ | VACANT | FULL | DONT CARE | ✓ | | ✓ | | ✓ (NOTE 4) | (NOTE 4) | (NOTE 4) |
| | NO | FULL | VACANT | DONT CARE | (NOTE 4) | | ✓ | | (NOTE 4) | ✓ | (NOTE 4) |
| | ↓ | FULL | FULL | DONT CARE | (NOTE 4) | ✓ | ✓ | | (NOTE 4) | ✓ | (NOTE 4) |

NOTES:

1. ALTHOUGH LS POSITION MAY BE INACCESSIBLE ITS STATUS CAN BE FULL IF IT HAD RECEIVED A WORD WHILE PREVIOUSLY ACCESSIBLE.
2. B VACANT AND LS POSITION VACANT OR INACCESSIBLE: READ TRANSFERS ARE BLOCKED DUE TO AN INSUFFICIENT SUPPLY OF INFORMATION; NO REQUEST RAISED.
3. CONTENTS OF C ARE IMMEDIATELY TRANSFERED TO B AS SOON AS C IS FULL. HENCE B IS TREATED AS FULL AS SOON AS C STARTS TO RECEIVE THE LAST BYTE OF AN INCOMING WORD FROM AN I/O SOURCE, EVEN THOUGH THE B FULL LATCH WILL NOT YET HAVE BEEN SET AT THIS TIME.
4. WHEN B IS FULL OR EFFECTIVELY FULL (C RECEIVING LAST BYTE) BOTH THE LEVEL 0 AND LEVEL 2 REQUESTS ARE UP. WHEN THE LEVEL 2 REQUEST IS THE ONE EFFECTIVELY EXECUTED (B→MS TRANSFER) BOTH REQUESTS ARE TURNED OFF AND STAT 3 IS RESET SINCE LS IS INACCESSIBLE; BUT IF A B→LS TRANSFER IS EXECUTED STAT 3 IS SET AND LEVEL 2 IS RAISED.

FIG. 11

WRITE OPERATION

| ANOTHER CHANNEL ACTIVE OR BLOCK CHAINING OP APPROACHING (NOTE 1) | CHANNEL QUEUE STATUS: LS POSITION ACCESSIBLE (NOTE 2) | LS POSITION STATUS (NOTE 2) | B REG STATUS | C REG STATUS | PRIORITY LEVEL OF WRITE REQUEST: 0 | 1 | 2 | WRITE TRANSFER ROUTINE EXECUTED BY COMMON (CPU) CONTROLS IF CHANNEL REQUEST IS SERVICED: MS→B | MS→LS | LS→B | SET I/O STAT 2 |
|---|---|---|---|---|---|---|---|---|---|---|---|
| NO | NO | VACANT | VACANT | 1/2 FULL OR LESS (NOTE 3) | | ✓ | ✓ (NOTE 4) | ✓ | | | ✓ |
| ↓ | ↓ | VACANT | VACANT | MORE THAN 1/2 FULL | | | ✓ | ✓ | | | ✓ |
| ↓ | ↓ | VACANT | FULL | VACANT (NOTE 5) | | | ✓ | ✓ | | | ✓ |
| ↓ | ↓ | VACANT | FULL | NOT VACANT | (NOTE 6) | | | | | | |
| ↓ | ↓ | FULL | VACANT | DONT CARE | ✓ | | | | | ✓ | |
| ↓ | ↓ | FULL | FULL | VACANT (NOTE 5) | ✓ | | | | | ✓ | |
| ↓ | ↓ | FULL | FULL | NOT VACANT | (NOTE 6) | | | | | | |
| YES | YES | VACANT | VACANT | 1/2 FULL OR LESS (NOTE 3) | | ✓ | ✓ NOTE 4,7 | ✓ | (NOTE 7) | | ✓ |
| ↓ | ↓ | VACANT | VACANT | MORE THAN 1/2 FULL | | | ✓ (NOTE 7) | ✓ | (NOTE 7) | | ✓ |
| ↓ | ↓ | VACANT | FULL | VACANT (NOTE 5) | | | ✓ (NOTE 7) | ✓ | (NOTE 7) | | ✓ |
| ↓ | ↓ | VACANT | FULL | NOT VACANT | | | ✓ | | ✓ | | |
| ↓ | NO | FULL | VACANT | DONT CARE | ✓ | | (NOTE 7) | | (NOTE 7) | ✓ | |
| ↓ | ↓ | FULL | FULL | VACANT (NOTE 5) | ✓ | | (NOTE 7) | | (NOTE 7) | ✓ | |
| ↓ | ↓ | FULL | FULL | NOT VACANT | (NOTE 6) | | | | | | |

NOTES:
1. IF LAST WORD BEFORE CHAINING OP IS WRITTEN FROM MS→LS WHEN B IS FULL CHANNEL WILL HAVE EARLIER ACCESS TO MS FOR THE CHAINING OP.
2. LS MAY BE INACCESSIBLE AND YET IT MAY HAVE FULL STATUS DUE TO PREVIOUS ACCESSIBILITY.
3. C IS ALSO TREATED AS 1/2 FULL IF IT IS 3/4 AND IS PRESENTLY UNLOADING A BYTE.
4. PRIORITY 2 IS RAISED FOR 1ST WORD OF A MESSAGE OR BLOCK.
5. B FULL, C VACANT IS IMMEDIATELY FOLLOWED BY B→C AND IS THEREFORE TREATED AS B VACANT, C FULL (i.e. B IS EFFECTIVELY VACANT.)
6. LS FULL, OR INACCESSIBLE, B FULL AND C NOT VACANT MEANS QUEUE IS BACKED UP (BLOCKED); THEREFORE CHANNEL WILL NOT ISSUE ANY WRITE REQUEST.
7. IF MS→B OR LS→B LEAVES LS ACCESSIBLE, IT IS FOLLOWED IMMEDIATELY BY A LEVEL 2 (LOW PRIORITY) "LOOK AHEAD" WRITE REQUEST FROM THE CHANNEL CALLING FOR TRANSFER OF THE NEXT WORD FROM MS TO THE BACK-UP (BUFFER) POSITION IN LS. IF HOWEVER B IS VACANT BY THE TIME THIS REQUEST IS SERVICED CPU EXECUTES MS→LS AND MS→B BUT SETTING OF LS FULL STATUS TRIGGER IS BLOCKED, LEAVING LS EFFECTIVELY VACANT.

SEQUENCE FOR TRANSFERING A BLOCK OF WORDS BETWEEN I/O SOURCE AND CPU VIA CHANNEL X.

READ ROUTINE RELATIVE TO CHANNEL X

READ ROUTINE $B_X \rightarrow MS_X$
(ONLY CHANNEL X IN SERVICE)

VARIABLE PRIORITY ACCESS SYSTEM

United States Patent Office 3,399,384
Patented Aug. 27, 1968

3,399,384

VARIABLE PRIORITY ACCESS SYSTEM

Peter N. Crockett, Matthew A. Krygowski, and Thomas S. Stafford, Wappingers Falls, N.Y., assignors to International Business Machines Corporation, Armonk, N.Y., a corporation of New York Filed Sept. 10, 1965, Ser. No. 486,326
17 Claims. (Cl. 340—172.5)

ABSTRACT OF THE DISCLOSURE

Input-output functions of a data processing system are expedited. The input-output channels of the system are permitted to vary priority of requests for connection to computer main storage, and to add or remove buffer registers in respective queues of tandem buffer registers between peripheral devices and main storage. Priority and queue length are varied as a function of load conditions within the respective queue.

This invention relates to a system for controlling access of a plurality of relatively asynchronous information handling equipments to a common apparatus. An important but non-exclusive application of the invention is in data processing systems wherein a number of input-output synchronizer or channel units are adapted to compete for access to a shared central processing unit in the process of exchanging information with the central unit.

It is not considered unusual to arrange for competitive access of plural equipments to a central exchange unit in a predetermined order of priority. Ordinarily, however, it is considered necessary to introduce design restrictions to compensate for such predetermined ordering. Because of this the individual equipment having the lowest priority rank may receive less frequent service from the common apparatus and must therefore handle intelligence having a lower frequency of recurrence than the maximum frequency of the intelligence handled by the other equipments, or else the number of individual equipments may be restricted to assure complete service to all equipments even when all are coincidentally active and are carrying maximum frequency intelligence. Another alternative would be to design the common apparatus for the "worst case" simultaneous demand situation. However, in periods of less than peak activity, the common apparatus in such a system would not be utilized effectively and it is generally more costly to construct such apparatus than to allow for variable performance of the type considered herein.

Accordingly, objects of this invention are to provide: a system for more effectively controlling access of individual equipments to common apparatus; an access control system of improved design; an access control system in which demands on the common apparatus are varied in accordance with the amount of activity under way in the individual equipments; and an access control system which is capable of responding variably to demands of the individual equipments as a function of the condition of activity in all equipments.

In a particular embodiment of invention disclosed herein a data processing system, having a main internal store and a central processing unit for processing intelligence held in the store, is arranged to cooperate with a plurality of data synchronizer equipments hereinafter called channel units. The channel units operate essentially simultaneously by a process of interleaved word transfers, to asynchronously carry variable length blocks of intelligence words between a plurality of input/output devices and the internal store, each channel linking a plurality of input/output devices in this fashion to the central processing unit. A system of channel units intercommunicating with an internal memory of a processing system in this fashion is disclosed in the U.S. patent application, Ser. No. 357,369 of L. E. King et al. entitled, "Automatic Channel Apparatus," which was filed Apr. 6, 1964 and assigned to the International Business Machines Corporation. Pertinent parts of this King et al. application are incorporated herein by this reference.

In the system disclosed by King et al. a Bus Control Unit (BCU) serves as a traffic controlling element to regulate access to the internal memory by a central process unit (CPU) and several channel units (CH). While any one unit (CPU or CH) has access to the internal memory the other units are excluded from access. When several channels are simultaneously working, the BCU grants each access to the memory for at most the time required to transfer a basic unit of information flow, which in the King et al. system consists of a pair of thirty-two bit words. Access to the memory when sought simultaneously by several channel units is granted by the BCU in a fixed order of priority. While this type of priority selection may be the least complex to implement it poses the problem that in the "worst case" situation (all channel units simultaneously active) one channel having lower priority than another channel could effectively be excluded from service causing possible over-runs in cyclic devices if the recurrence frequency of intelligence carried by it is less than the frequency in the other channel. If the channel carrying lowest frequency is granted a fixed highest priority, it could not thereafter be allowed to carry higher frequency intelligence without some form of manual or programmed reassignment of priority.

Accordingly, another object of this invention is to provide a variable priority selection system in which the competitive status for access to the central memory of a plurality of channel units is varied instantaneously in a flexible manner according to the instantaneous recurrence rates of intelligence being carried through the channels.

Another object is to provide a variable priority selection system in which a plurality of elements competing for selection are each capable of selectively producing a plurality of different categories of access demand signals calling for movement of a unit of information which have respectively different instantaneous competitive rank for priority of selection in response to instantaneous conditions internal to the element. Yet another object is to permit such elements to vary the said demand signals and the effects thereof effectively up to the instant of selection or as close thereto in time as is practicable.

A feature of the invention in connection with providing more efficient access control resides in the provision of individual access demand signalling means for each individual equipment. Each demand signalling means can be operated to selectively produce a plurality of different kinds of demand signals which have a predetermined order of priority inter se. The access controls in the common apparatus which determine the selection of an individual equipment are arranged to react in a first predetermined order of priority to demand signals of different kind, and in a second predetermined order of priority to demand signals of like kind issued by different signalling means. The selected demand signal will be the one having the highest rank of all currently active demand signals in both the first and second pedetermined orders of priority. Thus it should be understood that non-selected demand signals coincident with and of the same kind as the selected signal are associated with equipments having lower assignments of priority in the second predetermined order. As a consequence of this it is possible for any one active equipment to issue a demand signal of higher priority rank than demand signals of any other active equipment as the need for access of the one equipment becomes more urgent than that of the other equipment.

Another object of the invention is to provide a priority selection system for assigning access of a plurality of individual equipments to common apparatus in a variable order of priority such that one equipment cannot fail to receive service solely because its demands for access happen to continuously coincide with demands of other equipments, if in fact the need for access of the one equipment is more urgent that the needs of the other equipments.

Another feature of the invention permitting improved efficiency of communication between multiple individual equipments and common apparatus resides in the provision of an additional rapid-transfer information handling route within the common apparatus. In a particular embodiment of the invention described herein, there is a first ordinary-speed direct transfer route between the main store of a common central processing unit and individual buffer registers of individual channel equipments. In accordance with the present invention there is also provided an alternative indirect route which includes a first leg or segment between the main store and predetermined locations in a small capacity local buffer store within the central processing unit and a second leg or segment between the same local store locations and the internal buffer registers of the individual channels.

The time required to move a unit of information over the second leg of the indirect route is less than that required to move the same unit over the direct route; hence, as an entity the second leg may be considered a rapid-transfer route. However, the traversal time for moving information over the two legs of the indirect route, excluding stopover storage in the local store, is distinctively greater than the traversal time over the direct route. Further, since the local store has limited capacity it can only be used for short term storage if it is to hold more than its capacity during a series of transfers. Each transfer over the second leg of the indirect route must therefore usually be accompanied by a preceding or succeeding transfer over the first leg, depending upon the direction of the transfer. Hence, use of the complete indirect route is not without a long term time disadvantage, but the second leg of this route when used selectively as described below permits the central apparatus to provide more effective transfer services to several simultaneously active channel units under circumstances in which the direct route would be considered too slow since it would unduly delay service to the unselected channels.

Another object therefore is to provide a system for controlling transfers of information between the main store of a central data processing system and a plurality of channel units, via alternatively selectable differently timed transfer routes, whereby channel units may be more efficiently serviced with but relatively slight extension of the average interference with internal data processing operations of the central unit which would be expected for transfers over a fixed route.

Another object is to provide an occasional effect of high speed input/output transfer performance between a main store and channel units, using a main store having relatively moderate speed transfer characteristics; such a main store being considerably less expensive and requiring less advanced technology than a truly high speed store.

In the particular embodiment mentioned above the sequence controls of the central processing unit, in addition to their ordinary internal control functions, are required to participate in the information transfer process by selectively controlling the gates which permit passage of information signals through the previously mentioned direct and indirect routes. When participating in transfer operations, the sequence controls are unavailable for controlling internal processing operations of the central unit; hence transfer operations are performed by interrupting internal processing functions of the central unit. The two interruptions required for a complete transfer over the two legs of the indirect route are of longer combined duration than the single interruption characteristic of a direct route transfer; although the single interruption characteristic of a transfer over the second leg of the indirect route is of even shorter duration than the direct route interruption.

It is therefore a desirable object to strike a favorable balance between the effective prolongation of processing interruptions associated with selection of the indirect transfer route and the additional or quicker service which can be given to several simultaneously active channel units when the shorter second leg of the indirect route is used. Another object is to provide an access control system in which the priority levels of the channel access demands and the routes over which information is transferred between the central processor and any channel are variably selected to provide more effective service to the channels without unnecessary suspension of other processing functions. Yet another object is to permit selection of the longer indirect route for a particular transfer only when the over-all pattern of activity in all channel units indicates that times does not permit a direct route transfer or that a transfer anticipated at an indefinite later time could be more effecively carried out at such time over the indirect route.

In regard to the last object above a distinction should be noted concerning the direction of transfer. The act of transferring an information unit, hereinafter termed a word, from a channel unit to the central processing unit, is designated a READ operation, and a transfer in the reverse direction is termed a WRITE operation. It will be understood that each channel unit is used as a synchronizing intermediary in the conveyance of information between one or more input/output (source/sink) devices and the central processing unit. As a rule channel units will have little or no control over the rate at which they receive words from or deliver them to their associated input/output devices.

Consequently, in a READ operation a channel unit has a most urgent, or critical need for access to the central unit when it has a full queue, or "waiting line," load of words in its internal buffer registers and less critical needs when its buffer registers are partially or completely vacant. Conversely, in a WRITE operation the reverse order of importance is attached to the condition of occupancy of the channel buffer registers; the need for access increasing in proportion to the vacancy of the registers. Hence, in accordance with the present invention, each channel can issue different kinds or levels of access demand signals which are treated in an ascending or descending order of precedence by the central unit as the channel buffer registers fill with information moving respectively in the READ or WRITE direction relative to the central unit.

Whenever a channel unit has information to (READ) unload from its internal buffer to the central system it issues two demand signals; one effectively calling for a direct transfer to the central main store and the other calling for an indirect transfer to the central local store fast transfer over second leg). If no other channel demands are active the direct transfer is selected. But if other channel demands are active the second leg local store transfer is selected.

In such indirect route READ transfers a word is moved from the buffer register in the selected channel unit to a preassigned word register in the local store of the central unit where it remains for an indefinite but usually brief period of time. The central unit notifies the selected channel unit that its word has been placed in the assigned local store register and the selected channel unit responds by signalling one or more READ access demands, excluding the demand for the second leg transfer. This, in effect, calls for transfer of the same word from the assigned local store register to the main store via the first leg of the indirect route. This "first leg" demand, however, usually is given lowest precedence ranking and therefore, with few exceptions, will not interfere with the servicing of other channel requests. One exception occurs when another channel has an active "first leg" transfer request at the same lowest precedence level and no other requests are active. In this case, the access requests being of like level, the central controls base the selection of a channel unit upon the above-mentioned second predetermined order of priority assigned to the channel units.

In selecting a most effective route for a WRITE transfer other factors are considered. At the moment that a WRITE access demand of a particular channel is selected for servicing, note is taken by the common access controls of the conditions of use of the other channels. Another channel is noted to be IN USE if it is in the process of handling information regardless of whether it has an active access demand. If an IN USE condition is not detected the direct route, from the main store to the internal buffers of the particular channel, is selected and a word is transferred over this route. However, if another channel is IN USE and the channel's internal buffer is full, the word is moved from the main store to the above-mentioned preassigned location in the local store over the first leg of the indirect route. The selected channel upon being notified of this incomplete transfer sets a LOCAL STORE FULL latch. Thereafter when its internal buffer is vacant the channel issues a WRITE access demand to the central unit on a highest precedence level. When this demand is serviced the local store contents are delivered to the channel via the second leg of the indirect route and the LOCAL STORE FULL latch is reset.

Since at the time under consideration at least one other channel is IN USE it is possible that an IN USE channel will issue a demand which will be serviced before the highest precedence WRITE demand of the particular channel is issued. More significantly, however, since the latter demand of the particular channel is serviced by a WRITE transfer over the rapid transfer second leg of the intermediate route, the latter transfer will offer the least interference with (i.e. impose the least delay on) subsequent servicing of any demands raised by the other IN USE channels.

Hence, in both READ and WRITE transfers via the indirect route the preassigned location in the central local store may be viewed as an additional element or stage of buffer storage in the queuing facility of the associated channel unit which is used selectively to shorten the time allocated to individual channel units by the central unit when most urgent requests of several channel units are active simultaneously.

In a READ transfer from a channel unit the immediate choice of route available to the access controls is between the direct route and the effectively shorter second leg of the indirect route. Once the choice of the indirect route is made any advantage to be obtained from such choice is realized immediately upon completion of the second leg transfer. Hence, the choice of route is based upon the immediate conditions of all channel access demands.

However, in preparing for a WRITE operation the immediate choice is between the direct route and the equally long first leg of the indirect route. No immediate timing advantage is realized upon selection of the first leg; instead the advantage obtained is that once stationed in the local store a word is more rapidly accessible to the channel through the second leg of the indirect route than a word in the main store. Hence, the indirect route is selected for a WRITE transfer only when it appears likely that later conditions will require reduced interference with other channel transfer operations or shorter duration interruptions of the central unit. Thus, the main critique for route selection in a WRITE operation is the anticipated condition of other channel demands at an indefinite later time. The likelihood of having conflicting demands at such later time is indicated by the IN USE signal upon which this selection is based.

It is seen therefore that a further object of this invention is to provide several differently timed routes for handling information between common apparatus and individual equipment, which can be selected under common control in anticipation of the needs of the individual equipments whereby the common controls may be employed to control additional functions without degrading the service provided to the individual equipments.

As mentioned above, the particular common apparatus to be described herein includes a main store and a local store, the latter store being used as a buffer store in the indirect route handling. The significant features of these stores are that the main store has a much larger storage capacity than the local store, but the duration of a cycle of access to the main store is four times the duration of a cycle of access to the local store. Because of this a movement of information over the direct route between the main store and the channels takes considerably longer than a movement of information over the second leg of the indirect route. Movement of information over the first leg of the indirect route between the main store and local store requires at least as much time as the entire movement over the direct route since access to the main store is required in either case. Hence, the complete indirect route is longer than the direct route. Nevertheless, as generally indicated above there are circumstances in which an advantage can be gained by using the indirect route.

More particularly, in a series of WRITE transfers from the central processing apparatus to one of the channels the time at which each transfer will be needed is indefinite. Thus, if other channel equipments are simultaneously IN USE there is a possibility of conflict or interference at such indefinite times. Hence, if one channel has a full supply of queued up information in its internal buffer registers due to previous WRITE transfers, and if at least one other channel is concurrently IN USE the next word to be written into the one channel is moved on a "look ahead" basis to the local store position. Consequently, this word is more rapidly accessible to the one channel when the internal buffers of that channel later become vacant.

In a series of READ transfers between one channel and the main store whenever the one channel is granted access to the central apparatus to unload a word of information, if another channel is simultaneously demanding access the one channel is connected to the second leg of the indirect route and the word being transferred is routed to the central local store. The one channel must thereafter maintain a lower level READ demand to complete the transfer into the main store over the first leg of the indirect route. Since the transfer to the local store requires less time the common controls are released sooner to handle the demands of the other channels, if necessary, before the first leg transfer is completed.

Accordingly, another object is to provide a variable priority access system for exchanging information between a large capacity fast access main store of a central processing system and individual buffer registers of individual channel units in a variable order of priority and over a selected one of several differently timed routes.

Another object is to provide a priority access system for controlling the exchange of information between a common main store of a common apparatus and individual buffer registers of individual channel units, characterized by one or more of the following features: selection of the individual equipments on a variable priority basis, selection of a variable route for each transfer of information, sharing of common controls for the transfers and other functions, and use of a local buffer store in the common apparatus, which has a much smaller capacity and is more rapidly accessible than the main store, as an intermediate buffer station in one of said routes.

The foregoing and other objects and features of the present invention may be more fully understood and appreciated by considering the following detailed description thereof with reference to the accompanying drawing wherein:

FIGS. 10 and 11 are tables for explaining the conditions governing selection of routes in basic READ and WRITE routines respectively of the common central system.

Figure 9:
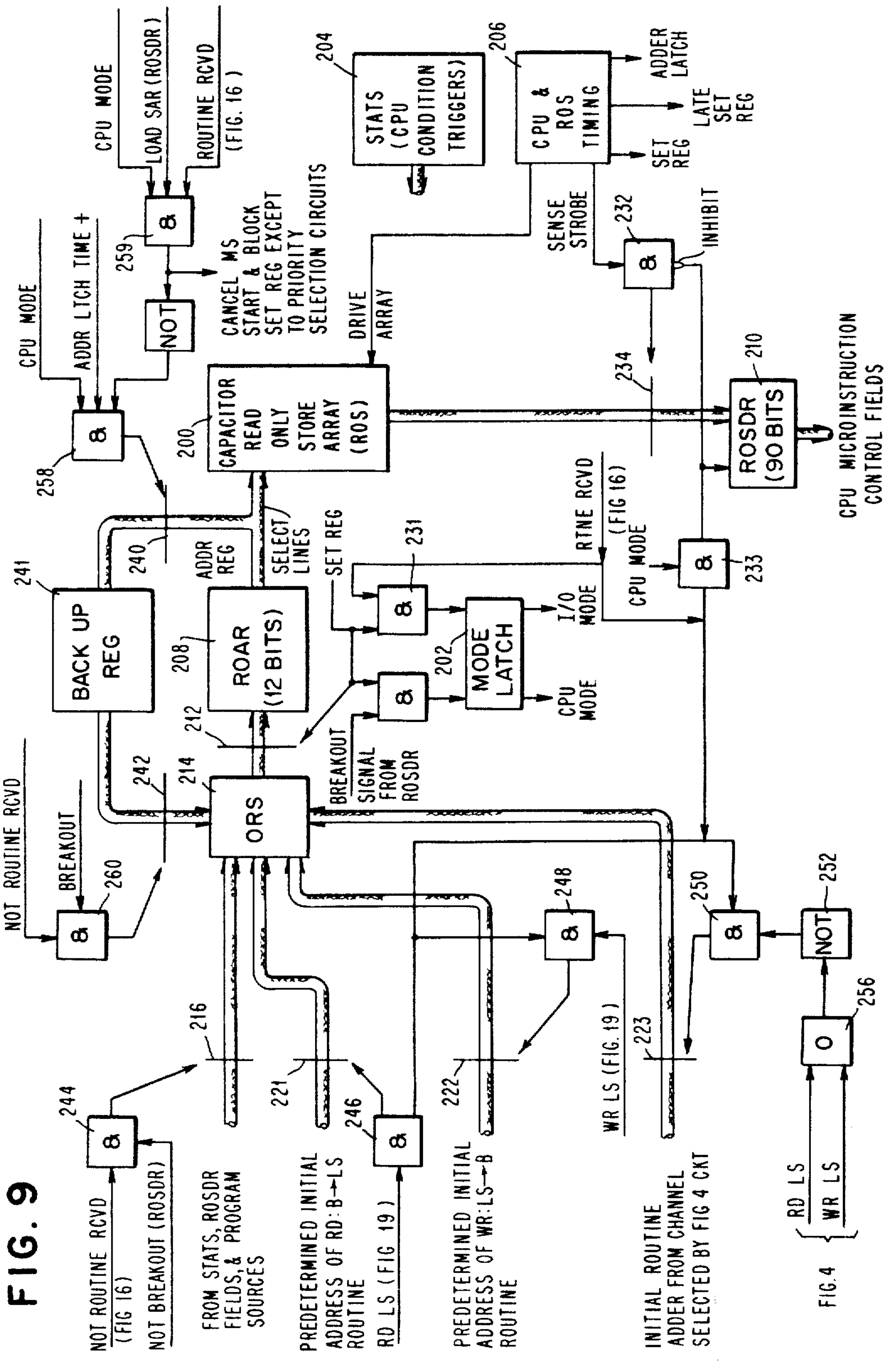
FIG. 9 is a diagram of the general organization of the sequence controls of the central processing unit.
Figure 15:
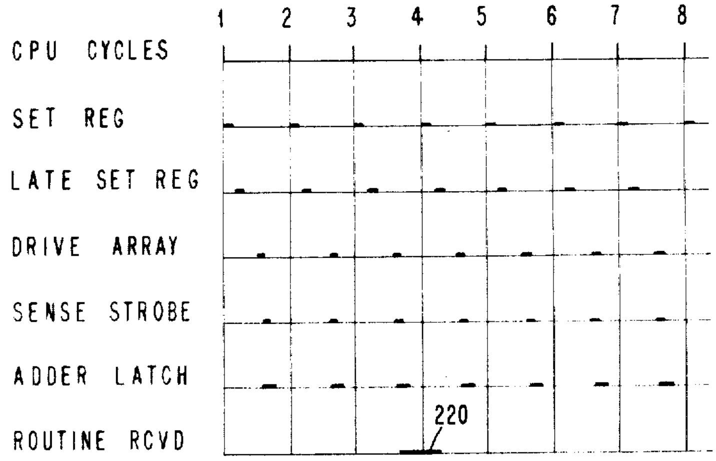
Figure 16:
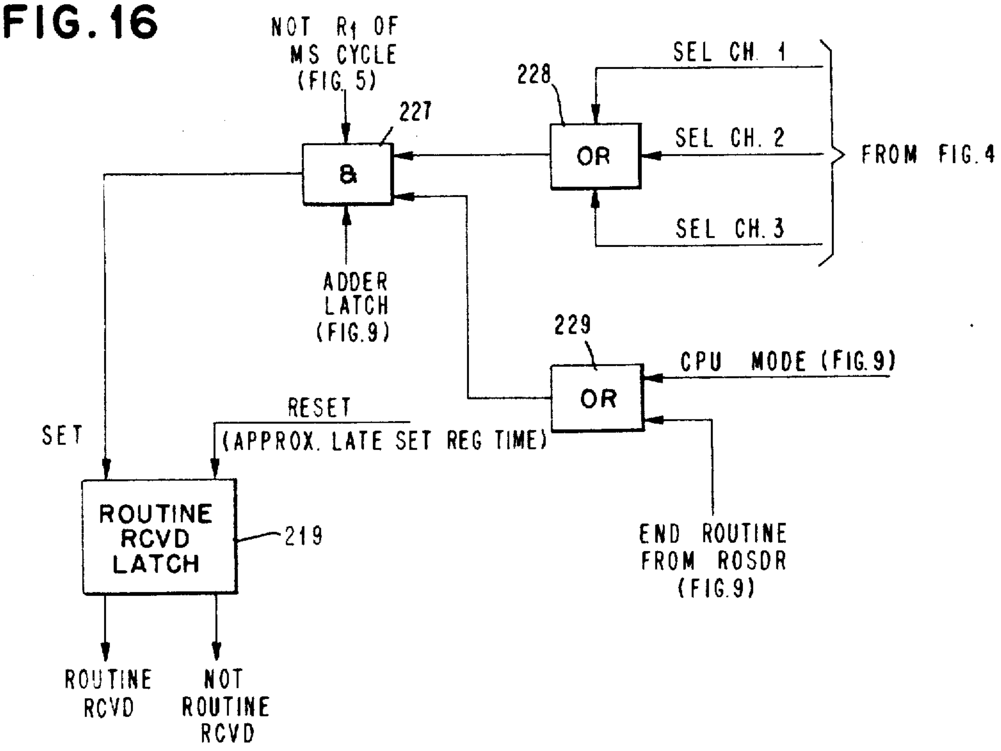
Figure 17:
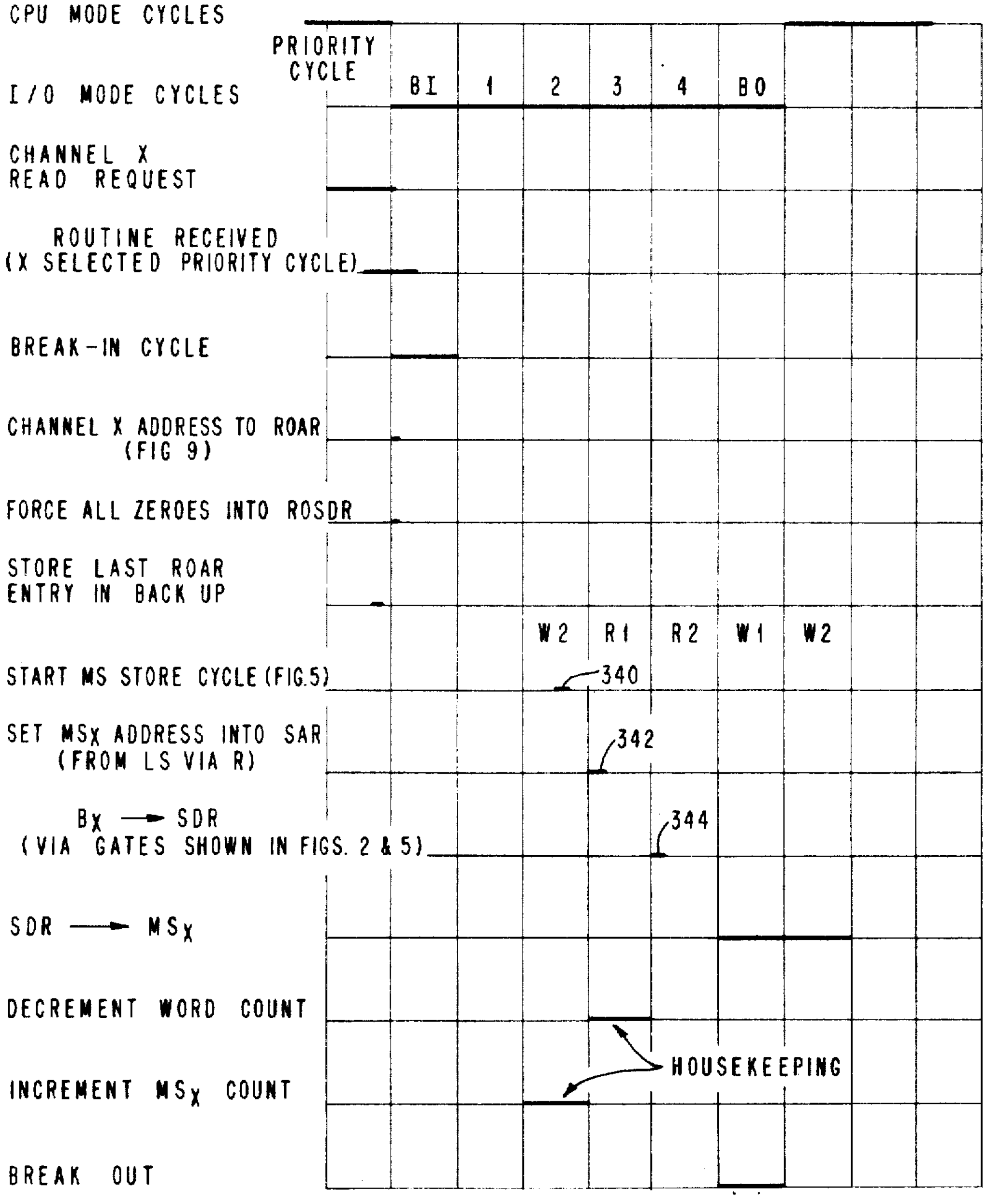
Figure 18:
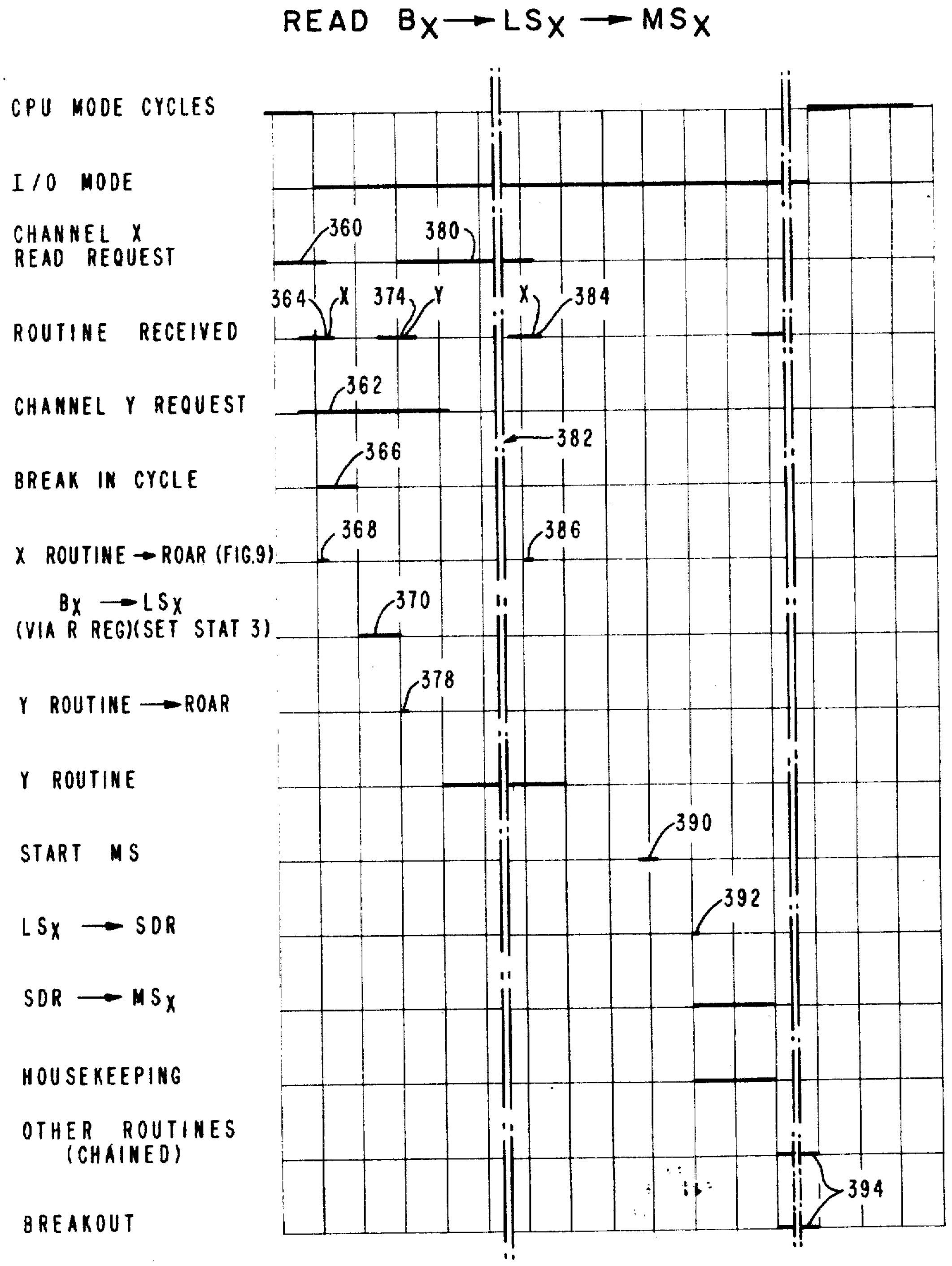
Figure 19:
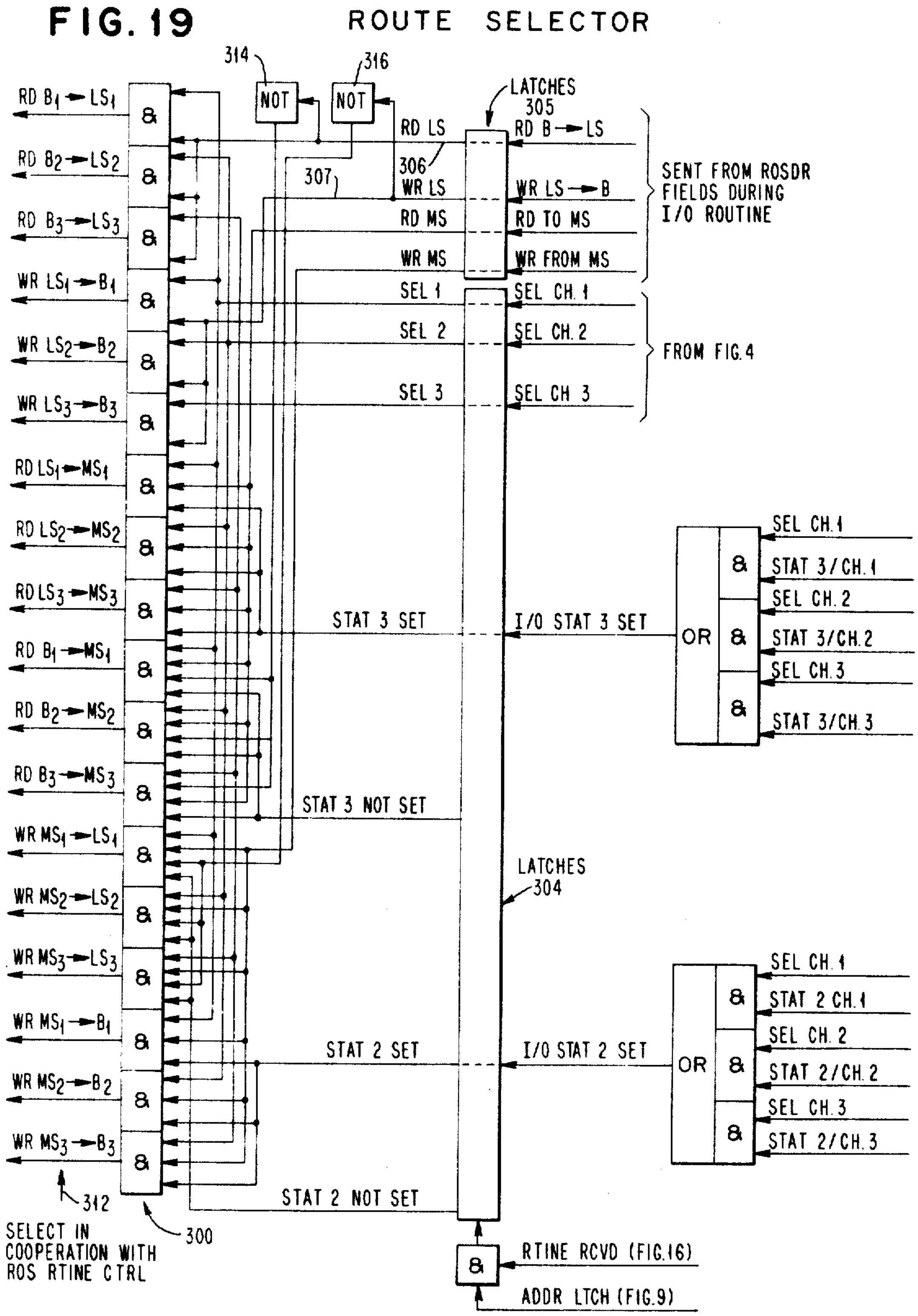
Figure 20:
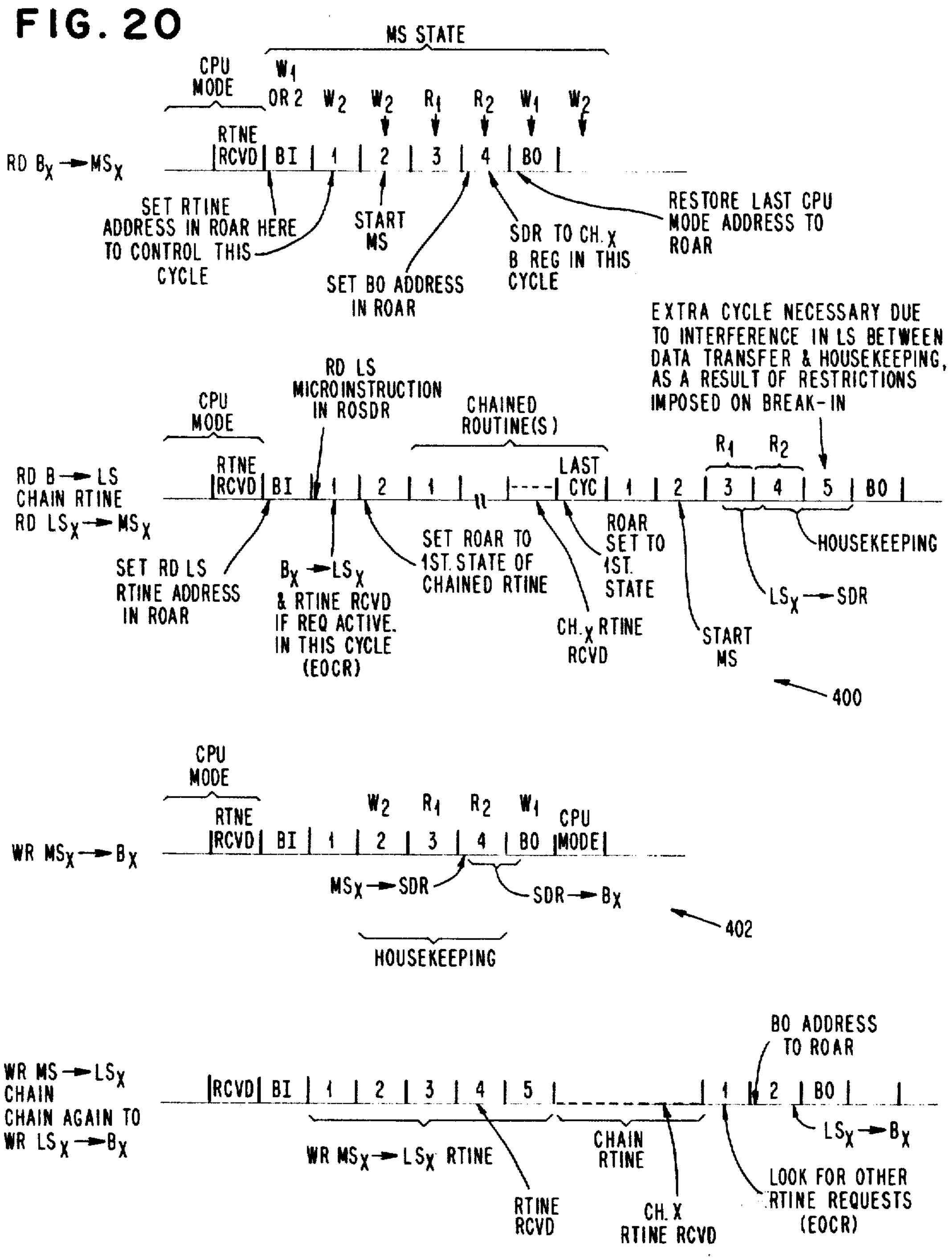

FIG. 15 indicates the logic for setting ROUTINE RECEIVED;

FIG. 16 is a time chart of the outputs of timing circuit 206 of FIG. 9;

FIG. 17 is a chart for explaining a direct READ routine without chaining of other routines;

FIG. 18 is a chart for explaining an indirect READ routine with interleaved chaining of other routines;

FIG. 19 indicates the route selection logic of the present invention;

FIG. 20 is an additional chart for contrasting READ and WRITE routines both direct and indirect; and FIG. 21 (*a* and *b*) indicate the channel control logic for respectively setting variable level requests and for maintaining up-to-date status indications required for conditioning such settings.

INTRODUCTION

Figure 1:
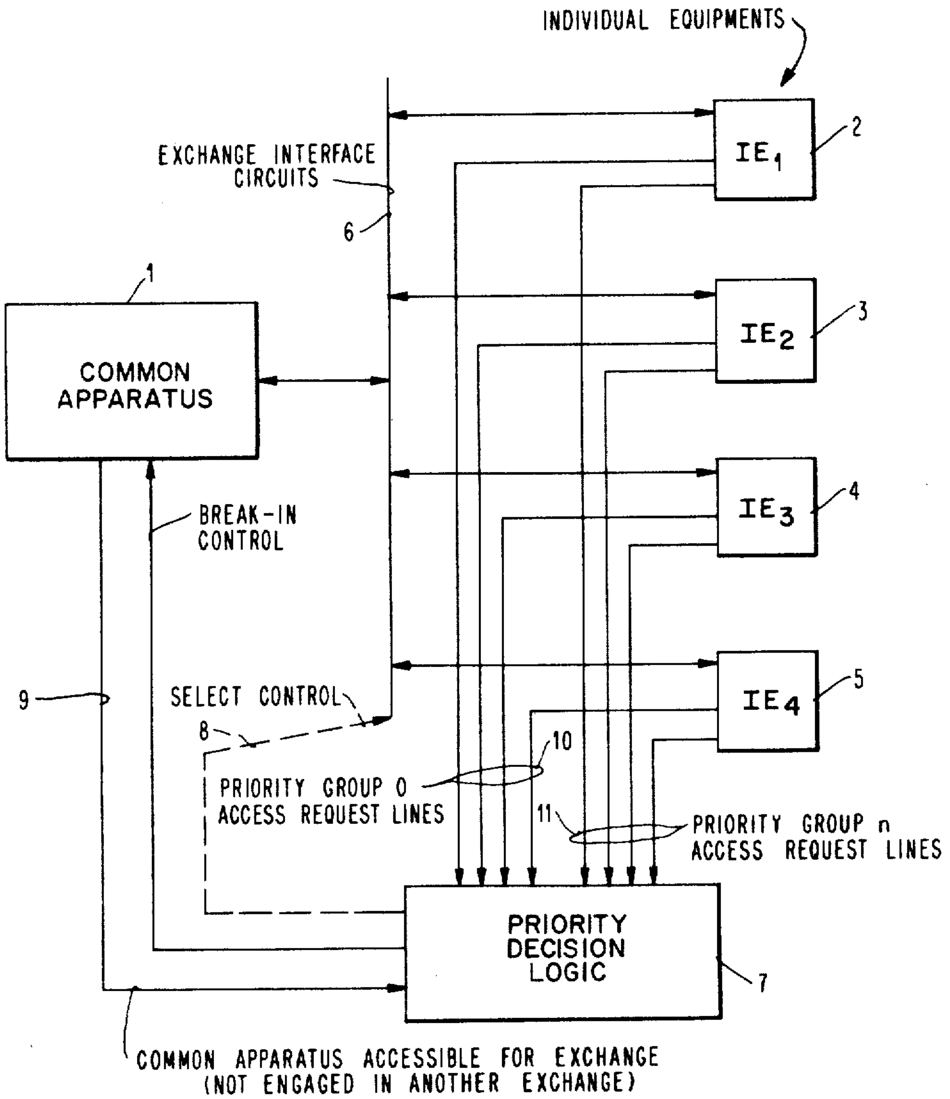
FIG. 1 is a generalized schematic block diagram used to explain certain general aspects of the invention.

Referring to FIG. 1, a system organized in accordance with the present invention includes common information handling apparatus 1 and a plurality of individual information handling equipments 2–5, the latter respectively designated $IE_1$–$IE_4$. Information is exchanged between the common apparatus 1 and the individual equipments $IE_1$–$IE_4$ via an information exchange network indicated schematically at 6. The individual equipments are connected one at a time, on a priority demand basis, to the common apparatus. When so connected a unit of information may be transferred either from the common apparatus to the selected individual equipment or from the selected individual equipment to the common apparatus.

The selection of an individual equipment for coupling through the exchange network 6 is controlled by priority decision logic circuits 7 via a connection shown schematically at 8. Each selection is based on the relative priority of access demand signals instantaneously issuing from the individual equipments $IE_1$–$IE_4$ and can occur only when the common apparatus is accessible for an exchange of information. The availability of the common apparatus is indicated by signals on the coupling shown schematically by line 9. Each of the individual equipments $IE_1$–$IE_4$ can issue access demand signals, also termed request signals herein, on a plurality of different priority levels. Thus, there are the highest priority level 0 requests coupled to decision logic 7 via the lines 10 and other lower level requests, denoted collectively as priority level *n* requests, carried by the lines 11.

The decision logic 7 is organized to grant priority to the individual equipment associated with the request having highest instantaneous priority rank, as soon as the apparatus 1 becomes accessible. Thus, if level 0 is considered the highest priority level and levels 2, 3 . . . *n* are considered progressively lower levels of priority, it will be seen that the decision logic would grant precedence to a priority level 0 signal over a priority level 1 signal, to a priority level 1 signal over a priority level 2 signal, and so forth.

The individual equipments also have a predetermined relative order of priority which for the sake of illustration is assumed to be in the order of the subscripts. Thus, for requests of like level, $IE_1$ is granted precedence over $IE_2$, $IE_2$ over $IE_3$, and $IE_3$ over $IE_4$. Hence, if $IE_1$ and $IE_2$ are simultaneously issuing level 0 requests the request of $IE_1$ will be honored first, whereas if $IE_1$ has a level 2 request and $IE_2$ has a level 1 request the request of $IE_2$ will be honored first. An individual equipment may have several different level requests active at one time, but the decision circuit 7 is influenced only by the effective request of highest priority rank as explained below.

It may thus be appreciated that if only one of the equipments $IE_{1-4}$ is in service its requests are serviced immediately regardless of level, whereas when several equipments are simultaneously in service a request of one may be ignored in favor of a request of another if the request of the first equipment has a lower priority rank than that of the other equipment. Since priority rank is a function of both the level of the request, as well as the relative priority assignments of the associated equipment for equal level requests, it follows that any equipment may be granted instantaneous precedence over any other equipment at random. It will be shown that by controlling the selection of request levels on a suitable basis, the individual equipments may be made to receive a more effective and equitable distribution of service from the common system (1, 6, 7).

GENERAL SYSTEM DESCRIPTION

Figure 2:
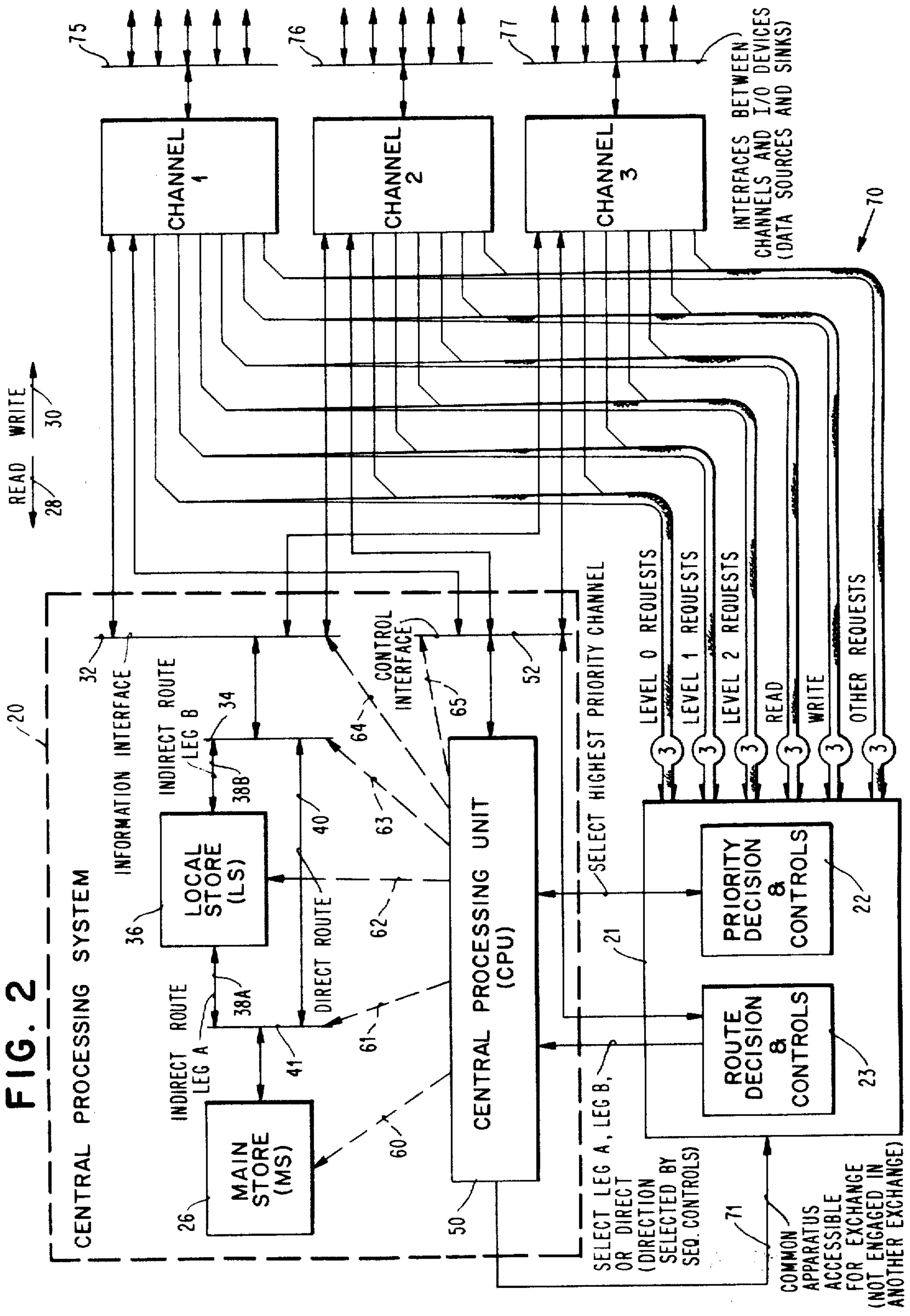
FIG. 2 is a schematic block diagram of a particular embodiment of the invention as applied to exchanges of information between the main store of a central information processing system and a plurality of individual input/output channel units in which the central controls are shared for the exchange function.

FIG. 2 illustrates the application of the general principles of invention hereof to the control of exchanges of information between a central data processing system shown in broken outline at 20, and individual channel units denoted channel 1, channel 2, and channel 3. While the invention is therefore described with reference to a system of three channel units it should be understood that it is not limited thereby since no change in principle is required to accommodate additional channel units or to delete one of the three units. The decision circuitry indicated generally at 21 differs from the decision logic circuitry 7 implied in FIG. 1 in that in addition to circuits 22 for selecting the channel having the request of highest instantaneous priority rank for connection to the central system, it also includes route selecting circuits 23 for determining the route over which a unit of information is to be passed between the selected channel and the main store 26 (abbreviated MS) of the control processing system.

As indicated by arrows at 28 and 30, the process of moving information from a channel unit to MS is characterized by the term READ while the process of moving information from MS to a channel unit is characterized by the term WRITE. The common information exchange system through which the information moves between MS and the channel units is considered part of the central system and includes a first connecting link 32 which couples to a second connecting link 34. The latter routes information either between a channel and a selected buffer register position in local store 36 (abbreviated LS), which represents a stopover station in an indirect route 38, or directly between a channel and MS via a direct route 40 and connection link 41. The indirect route 38 includes one leg 38A between LS and the MS link 41 and another leg 38B between LS and the channel link 34.

The central processing unit (CPU) of the central processing system is shown schematically at 50. Included in this box are all of the arithmetic and program instruction interpreting circuits and sequence controls required for the central processing function. Selecting and connecting link 52 carries control information between the channels and both CPU 50 and route decision logic 23. The CPU controls all elements of the system 20 via control connections shown schematically at 60 to 65.

Implied at 60 are all of the controls required to initiate a cycle of operation of MS, to specify an address location within MS, and to specify the type of transfer function required of MS (STORE if new information is being entered into MS, or FETCH if stored information is being non-destructively read out of MS).

Implied at 62 are the controls required to initiate a cycle of operation of LS, and to STORE or FETCH information relative to a selected address location in LS.

Implied at 61 are the controls required to transfer information bidirectionally between MS and either indirect route segment 38A or direct route 40.

Implied at 63 and 64 are the controls required to negotiate a transfer of information in either direction between either route segment 38B or direct route 40 and any one of the three channels.

Implied at 65 are controls governing the exchange of control information between CPU 50 and the channel whose information is being selected by the controls 64.

The priority and route decision controls 21 receive request (demand) signals from the channels via lines 70 and availability signals from CPU 50 via line 71. While the system 20 is engaged in internal processing functions line 71 is constantly energized to indicate that the system 20 is continuously available for communication with a channel. This means that as a general rule channel-center processor intercommunications take precedence over internal processor functions.

During an exchange (transfer) of a basic unit of information (word) between processor 20 and a channel the line 71 is de-energized. Hence, once the processing of a channel request is under way is cannot be interrupted by another request. It will be noted that for a READ or WRITE transfer operation the processing of a channel request comprises a selected basic routine which includes all actions required to pass a word either between a selected one of the channels and a selected location in one of the stores, LS or MS, or between selected locations in the sores LS and MS. These routines are not to be confused with the composite routines, made up of series of basic routines, by means of which entire messages are transferred between MS and the channels. The basic routines are indivisible (non-interruptibe) whereas successive basic routines of a composite routine need not, and in general will not, be performed consecutively in time, but rather may be interleaved with basic routines of other channels or, in general, other internal processing routines of the system 20. Thus, it will be understood that the line 71 is de-energized only while a basic routine of communication between one channel and the system 20 is in progress and is re-energized as the terminal operation of the basic routine is approached.

In operation, the system 20 operates periodically in elemental cycles of half-microsecond duration, to perform elemental (micro) operations of internal program instruction processing routines and basic channel intercommunication routines. Groups of consecutively executed elemental operations constitute a routine.

The process by which control word and program instruction intelligence is initially loaded into MS is generally the same as that disclosed in a co-pending U.S. patent application, Ser. No. 357,372, of G. M. Amdahl et al, filed Apr. 6, 1964 and assigned to the International Business Machines Corporation. Pertinent parts of the disclosure in that application are incorporated herein by this reference.

With initial program and control word intelligence loaded in MS the system 20 is ready to undertake further information exchange and processing functions. At this point when an input/output device becomes available to deliver intelligence to or receive processed intelligence from the central system 20 a START *I/O* procedure, which is also described in the abovementioned Amdahl et al. patent application, is executed by the system 20 to prepare the associated channel and the CPU with status and control information appropriate for the contemplated exchange, including such items as initial address count which designates the initial location in MS which is to be addressed, a length count indicating the number of words to be transferred between MS and the channel, information pertaining to identification and control of an input or output device, if necessary, and command information indicating to the channel what action is required of it. Channels can be directed to execute READ and WRITE type commands to respectively transfer blocks of words between the channel and MS, and between an input or output device respectively and the channel.

After START *I/O* the system 20 proceeds with its internal processing functions and the channel proceeds independently of the system 20 to execute its commands. The system 20 refers to program instructions in MS for its control and the channel refers to a command which it received from MS during the START *I/O* procedure.

When a particular channel is executing a READ or WRITE type command it will from time to time, under circumstances described in greater detail below, signal a READ or WRITE access request to the common controls 21 via one or more of the lines 70. If at this time system 20 is engaged in internal processing functions and no other channel has an active request, system 20 immediately (within one minor cycle) discontinues the internal processing function and breaks in to attend to the particular channel's request with a basic READ or WRITE routine. Thus the routine moves a unit of information between MS and an internal buffer of the particular channel, or between MS and LS, or between LS and the buffer of the particular channel. The routine is also used to increment the MS address and length count information whenever a transfer relative to MS is negotiated.

In order not to disturb the results of internal processing during basic routine break-ins, the routes 38 and 40 are designed to involve a minimum of additional central system registers and circuits external to the stores MS and LS.

Prior to each basic routine the common controls 22 select the channel request which is to be honored, signal acceptance to the selected channel via controls 50, and if the system 20 is engaged in internal processing operations, initiate the break-in action required to prepare the system to execute the basic routine. If at the time of request selection (hereinafter identified by: ROUTINE RE- CEIVED) the system 20 is completing a previous basic routine, no BREAK-IN preparation, other than placement of a new initial address in ROAR (FIG. 9), is necessary; the new routine is merely chained continuously to the end of the previous routine.

Relative to the elemental cycles of operation of system 20 an unchained basic routine requires one elemental cycle for break-in, a variable number of cycles to transfer a word and selectively up-date the MS address and length count information and a cycle for break-out (to restore the conditions preceding break-in). In a chained basic routine the BREAK-IN or BREAK-OUT cycle is eliminated depending respectively on whether the chaining precedes or follows the routine.

During or prior to the transfer and selective count update phases of each basic routine, the common controls 23 receive certain information from the channel being serviced. This information determines the type of routine (READ or WRITE) and usually in conjunction with other information, but in certain instances exclusively, also determines the transfer route segment 38A, 38B or 40.

To avoid later confusion it is noted here that although the controls 23 are shown as separate from the controls 50, as the particular details of this disclosure unfold below it will be appreciated that some parts of the controls 23 are integral to the control storage section of the controls 50, and that some parts of the controls 22 and 23 are common.

The channel request selected by the controls 22 will be the one having highest instantaneous priority. Each channel can selectively produce requests on four different groups of lines. These are denoted level 0, level 1, level 2, and level 3 requests. Level 0 is considered higher in priority than level 1, level 1 is higher than level 2, level 2 is higher than level 3, and level 3 is therefore the lowest level of priority. For requests of like level a request of channel 1 takes precedence over that of channels 2 and 3, and channel 2 takes precedence over channel 3.

READ and WRITE requests are issued on level 0, 1, or 2, but never on level 3; the lowest level being reserved for other relatively less time dependent channel-processor communications. Since such other functions are not at all pertinent to the present invention level 3 will not be considered further herein.

The route selected by the controls 23 will depend upon the following factors: type of routine (READ or WRITE the status of other channels (IDLE, IN USE, REQUEST, ACTIVE), the status of information flow in the selected channel (local store and internal buffer occupancy); and certain other factors treated briefly below which are not as pertinent as the particular factors just mentioned.

*Additional background and explanatory information*

The CPU and its sequence controls 50 operate periodically in one of two modes; each cycle having a duration of one-half microsecond. While internal processing operations are in progress the CPU controls are conditioned to operate in CPU mode. While executing basic *I/O* transfer routines the same controls are conditioned to *I/O* mode. The CPU controls are capable of reverting from CPU mode to *I/O* mode operation within a fraction of a CPU cycle of operation, and from *I/O* mode to CPU mode in similar time. A cycle in which a reversion takes place from CPU mode to *I/O* mode operations is termed a BREAK-IN (BI) cycle. The reversion from *I/O* mode to CPU mode takes place in a BREAK-OUT (BO) cycle.

When operating an *I/O* mode the CPU is unavailable for performing CPU mode internal processing operations. It is therefore desirable to avoid any unnecessary prolongation of operation in *I/O* mode which would interfere with or degrade the internal processing performance of the CPU. This invention seeks to produce a favorable balance between necessary extensions of the time required for *I/O* mode operations and interference with CPU mode operations.

*Main store*

Figure 5:
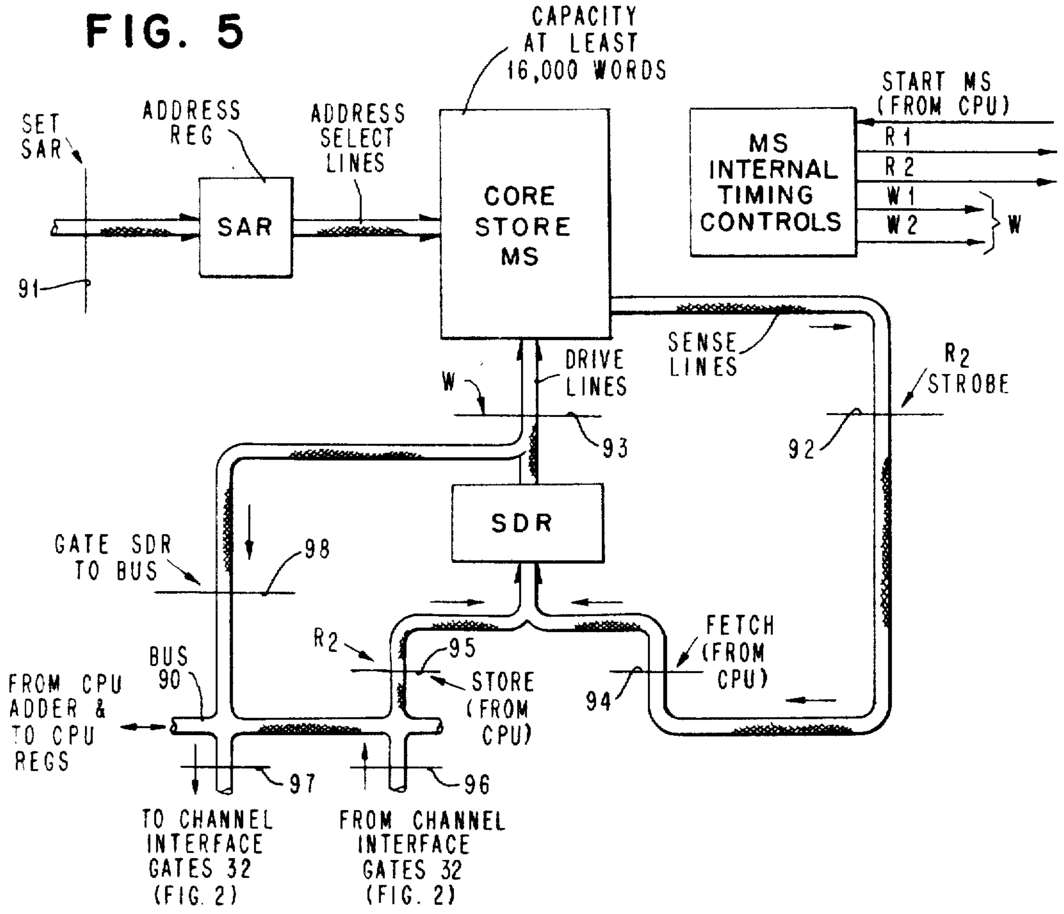
FIG. 5 is a schematic diagram of the organization of the main store of the central processing unit.
Figure 6:
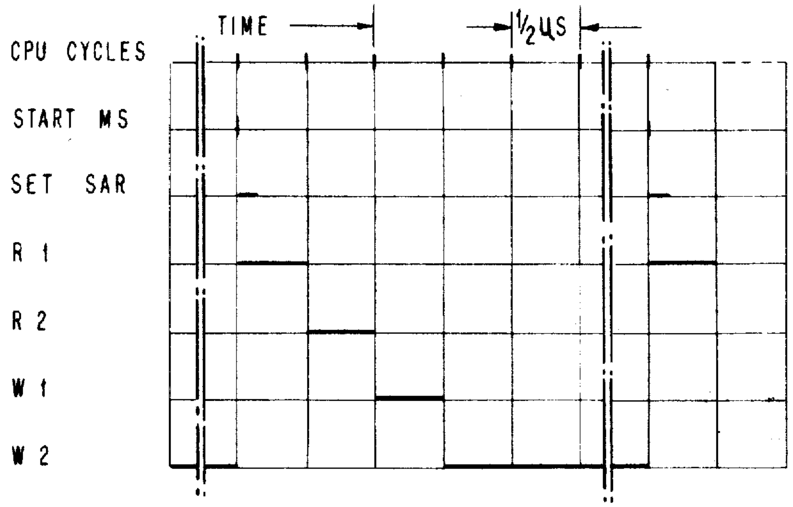
FIG. 6 is a timing chart used to explain STORE and FETCH operations relative to the main store in FIG. 5.

The main store 26 in the CPU is a four-cycle store. Each cycle of operation of MS coincides with four cycles of CPU operation. Referring to FIGS. 5 and 6, in the first half ($R_1$, $R_2$) of an MS cycle signals representing a word of information are transferred from an internal location in matrix MS specified by contents of a storage address register SAR (FIG. 5) to the sense lines of MS. Depending upon whether a STORE or a FETCH operation is in progress, the signals on the sense lines, or signals on external input lines, are selected for transfer into the storage data register SDR (FIG. 5) of MS. In the terminal half ($W_1$, $W_2$) of an MS cycle, the contents of the register SDR are transferred into the internal location of MS specified by SAR.

In a FETCH operation signals on the sense lines of MS are selected for transfer into SDR during the R half cycle and the contents of SDR are transferred to the selected internal location of MS during the W half cycle. Thus, the fetched information transferred into SDR is available for read out to circuits external to MS and is regeneratively returned to the same place in storage, for a non-destructive read out effect.

In a STORE operation the information appearing on the sense lines is blocked and other information is transferred through external bus 90 (FIG. 5) into SDR during the R half cycle of MS. Thereafter during the succeeding W half cycle the new information thus acquired by SDR is transferred to the internal location selected by SAR. Gates 91–98 control the flow of information throughout the sub-system of FIG. 5.

*Local store*

Figure 7:
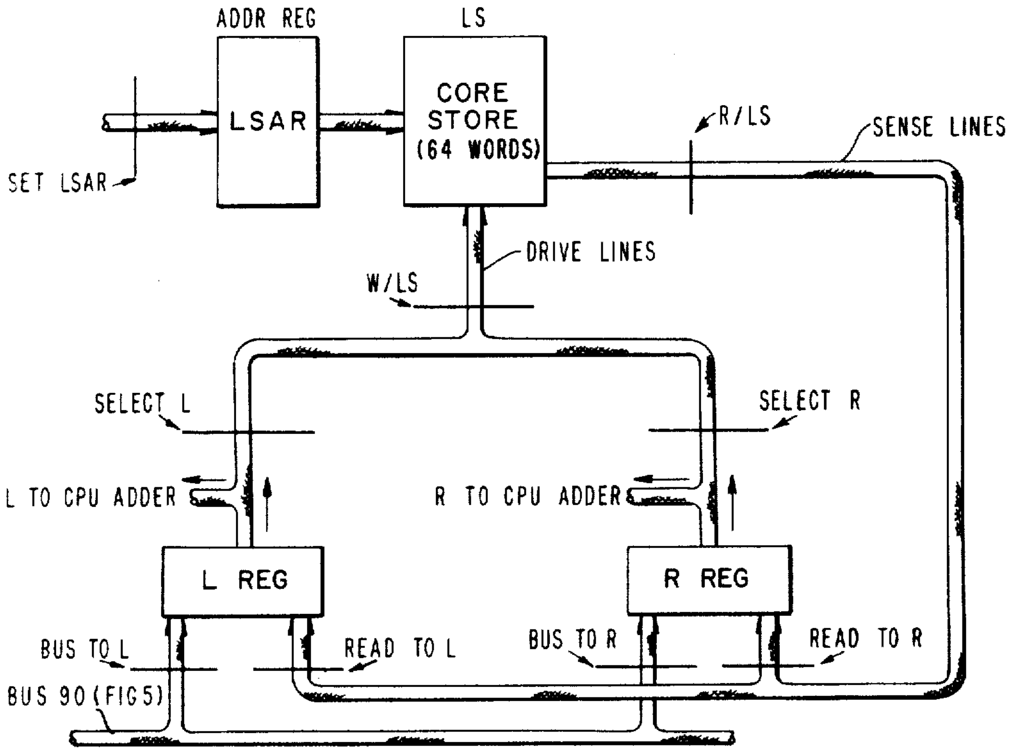
FIG. 7 is a schematic diagram illustrating the general organization of the local store of the central processing unit.
Figure 8:
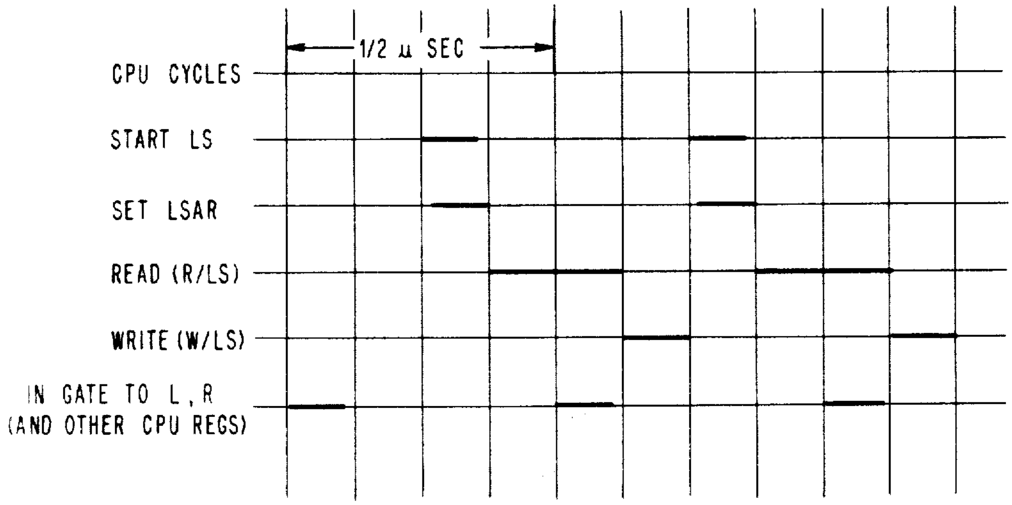
FIG. 8 is a timing diagram used to explain the operation of the said local store and to contrast the timing of such operation with the main store timing of FIG. 6.

Local Store (FIGS. 7 and 8) operates in a manner similar to MS except that its cycle of operation is of the same duration as a CPU cycle, and there is a little more freedom of choice in the selection of information to be processed during the WRITE (*W/LS*) half cycle, as will be clear from the following discussion. In the READ half cycle (*R/LS*) information is invariably transferred from an internal location specified by the local store address register (LSAR) to one of two buffer registers of the CPU, which are identified as the L and R registers. In the *W/LS* half cycle the information in either register L or register R may be selectively transferred to the location selected by LSAR. While information is being transferred into LS during *W/LS* (i.e. at the beginning of the next CPU cycle), the information previously carried from the sense lines into the L or R register may be progressively moved out through the main bus 90 to the channels. Conversely, during the *R/LS* half cycle information signals propagating from a channel toward the L or R register may be progressively continued on their way during the subsequent *W/LS* half cycle into an internal location of LS.

For READ and WRITE transfer operations a separate buffer word register location (in the specific embodiment under consideration one word is 32 bits) is set aside within LS for each channel, for use during intermidate route transfers as explained further below. It may be appreciated that the individual buffer locations in LS are thus used selectively as queuing or waiting line buffer register extensions of the corresponding channels when rapid transfer service is required. For example, in a READ operation it may be necessary because of the condition of certain internal buffers of the channel to immediately transfer a word unit of information into the central apparatus in order to make room for an additional word of information which may be imminently entering the channel from an uncontrollable input device such as a tape or other bulk storage unit. Suppose further that a second channel is in a similar status and has a basic routine request pending. At such times it may not be feasible to devote the four-cycles required for access to MS to the first channel and therefore the shorter route to LS may be the only useful alternative.

Likewise, in a WRITE operation because of the status of information flow in a particular channel and activity proceeding concurrently in other channels it may be desirable to move a word of information from MS into LS on a "look ahead" basis so as to make that word more rapidly accessible to the particular channel when that channel becomes ready to accept the word. In such circumstances therefore it is desirable to move information from MS to LS in a first relatively slow basic WRITE routine, and then later, in a second relatively fast basic WRITE routine move the same information from LS to the particular channel.

In connection with transfers of information between the channel and CPU another noteworthy feature of the present system is that the request signalling channel controls and the common controls are so organized that one channel cannot "hog" the common controls for more than a single basic routine if other channels would be obstructed. Thus, in a READ routine, a transfer over the indirect route from a channel to MS is broken up into two discrete READ routines which are separated in time by other *I/O* routines if other channels happen to be requesting service of a higher priority nature when the transfer over leg B is completed. Special precautions for preventing a WRITE operation from hogging the common controls are unnecessary since a WRITE to LS transfer occurs only when the buffer registers of the channel are full, and is designed as mentioned above to provide a back-up or additional waiting line word in LS for rapid transfer to the channel. Thus, the likelihood of the channel registers becoming vacant and requiring immediate service after a WRITE transfer over leg A of the indirect route is very small.

In response to a level 0 WRITE request, the controls 21 and 50 (FIG. 2) cooperate to execute a WRITE routine over leg B of the indirect route. Thus, a level 0 WRITE (WRITE LS to B) routine will be performed only when preceded by an MS to LS WRITE transfer routine. Similarly, a level 0 READ request is associated with the reading of information from a channel over leg B of the indirect route local store (B to LS) and is invariably followed up by a subsequent level 2 READ request to continue the movement of the information from LS to MS.

It is significant to note that a READ transfer over the indirect route begins with a level 0 READ request, whereas a WRITE transfer over the indirect route begins with other than a level 0 WRITE request and concludes with a level 0 WRITE request. This is because in a WRITE transfer the movement of the information over leg A is not associated with any time urgency, but rather only with the need for a back-up word of information in the waiting line buffer position in LS. In the WRITE transfer over leg B time is of the essence since other channels are simultaneously requesting service. Thus, leg B must be negotiated rapidly while leg A may be negotiated at a relatively slow pace.

*MS to LS transfer conditions*

An MS to LS WRITE routine for a given channel is selected when another channel is in use. It should be understood that another channel being in use does not necessarily imply that such other channel has a request pending on one of its request lines, but rather that the other channel is in the process of handling information or performing some other operation requiring an exchange of information between it and the CPU, such that it may energize one of its request lines at any indeterminate moment. It will be appreciated that if the other channel should energize its request line when the internal buffer registers of the given channel become accessible, and if only the direct route was available to the given channel, the time gap in the servicing of the other channel would be considerably widened relative to the time gap created by a transfer from LS to the given channel. Accordingly, it is generally advantageous to have an additional back-up word in the waiting line buffer of LS whenever a channel is engaged in WRITE operations and another channel is in use, regardless of whether the other channel is actively requesting service from the CPU.

*Channel to LS transfer conditions*

Circumstances determining the selection of the indirect route for a READ operation are somewhat different. In a READ operation the route to LS is selected only when the requesting channels internal buffer registers are full, and the direct route might be too slow for the requesting channel or impede central service to other channels actively requesting service. Thus, the decision for selecting the intermediate route is based on the requesting channel having a highest priority level 0 READ request active while a request of another channel is coincidentally active.

*Channel description*

Figure 3:
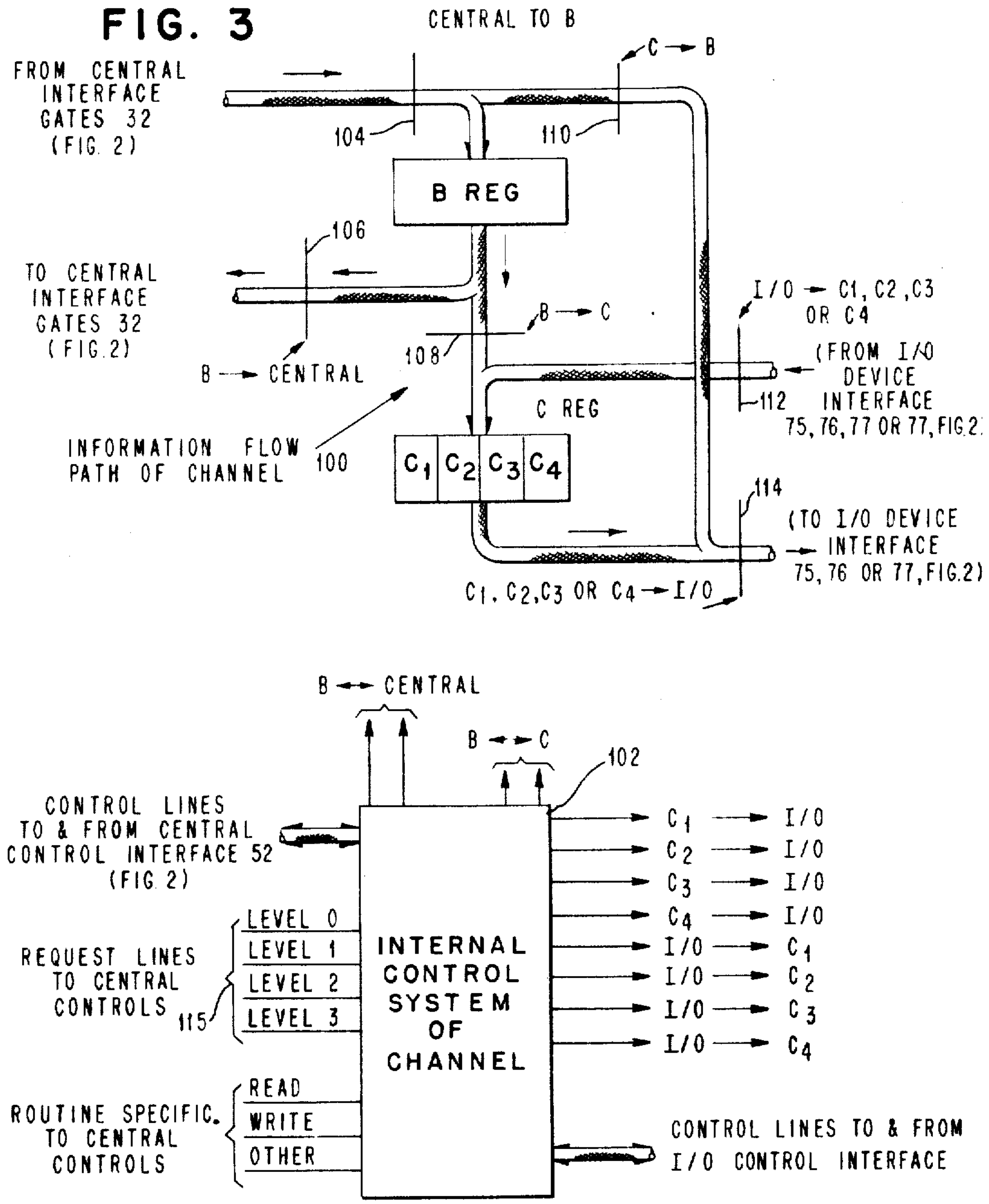
FIG. 3 is a schematic drawing illustrating the organization of a typical channel unit representative of any of the three channel units shown in FIG. 2.

Each channel as shown in FIG. 3 includes B and C waiting line buffer registers, each having the capacity to hold one word of information. The B registers can deliver or accept a word of information respectively to or from the CPU interface 32 (FIG. 2) and also it can deliver or accept a word to or from the C register. The C register usually serves as an assembly or dispersal buffer in transfers of information between the B register and an external I/O device connected to the interface 75, 76, or 77 (FIG. 2) of the associated channel. Such a device might, for example, be a tape or disc storage unit, or an adapter associated with several such units.

In a READ operation relative to the CPU words of information are progressively handled through the C register and B register to the interface 32 (FIG. 2) from which they are taken, via either the direct or indirect route discussed above, into MS. In a WRITE operation relative to the CPU, words of information are taken from MS through either the direct or indirect route to interface 32, thence through the B and C registers to the interface 75, 76, or 77 of the channel, and thence to the appropriate I/O device coupled to one of the output terminals of the latter interface. The channel includes request controls for indicating the type of operation (READ, WRITE, . . .) it requires of the CPU and other request controls for indicating the priority level to be associated with a pending request. It is noted that the devices coupled to the input terminals and output terminals of the channel need not, and in general will not, be synchronous with the CPU.

A typical channel of the type presently under consideration as shown in FIG. 3 includes an information flow path 100 and internal controls 102 for regulating the flow of information in said path in accordance with conditions external to the channel.

The information flow path includes the two internal buffer registers of the channel—the B and C registers—and connecting gates and buses. The latter include WRITE gates 104 for carrying information words in parallel form from the central interface 32 of FIG. 2 to the B register (in basic WRITE routines) and READ gates 106 for carrying information words in parallel from the B register to the central interface 32. Other gates 108 and 110 convey words of information in parallel between the B and C registers in the indicated directional sense. Yet other gates 112 and 114 controllable selectively in quarterword (byte) sub groups control the movements of byte units of information between the C register and the external I/O interface 75, 76, or 77 (FIG. 2) associated with the particular channel.

The controls 102 supply all of the signals for controlling the internal gates of the channel in flow path 100 as well as the signals required for a synchronous movement of information between the channel and the central system and also between the channel and the input/output devices to which it connects.

Each channel operates to carry variable length blocks of information words between an input or output device and the central system. For the present discussion it may be assumed that the channels are each connected to one and only one device during a block transfer, and that the information is handled only in parallel word units across the central interface 32 and only in byte units across the I/O device interface 75, 76 or 77.

Except for the size of words handled across the central interface from the B register, and except for the provision of four access request lines 115 which can be selectively energized by the controls 102 in response to the conditions of vacancy or occupancy of the B and C register (as indicated by B and C STATUS triggers, FIG. 21), and of the local store buffer position assigned to the channel (as indicated by a LOCAL STORE STATUS trigger, FIG. 21), the channel controls are organized generally along the lines disclosed in the above referenced Amdahl et al. patent application and its incorporated references. Since only these status and request line controls are considered pertinent to the present invention, only these controls are described herein.

*Block transfer procedure—General (FIG. 12)*

In preparing for a READ or WRITE block transfer the channel and central apparatus first communicate by means of a START I/O routine in which the central system is controlled by a START I/O instruction retrieved from its main store MS. Thereafter, the central system continues to operate under stored program instruction control until interrupted by one or more channel demands (requests). As soon as a request is received the program instruction control sequence is broken and one or more basic routines are executed to service the request(s).

In a block of READ transfers the channel collects a word from an input device in its C register, one byte at a time, at the demand rate of the I/O device. When the C register is full (four bytes received) the word in C is immediately transferred to B. Then with B full the channel requests a basic READ routine from the central system.

When its request is granted priority and serviced by the central controls the word in B will be moved in a basic READ transfer routine either to a particular position in MS (FIG. 2) via direct route 40 (FIG. 2) or to a predetermined buffer location in LS (FIG. 2) via indirect route segment 38B (FIG. 2), depending upon the route selection made by the central controls 21. The particular position in MS is determined by address count information which is stored in another predetermined location in LS during the START I/O procedure and incremented after each transfer. The buffer location in LS is different but predetermined for each channel.

If a B to LS READ transfer is selected the MS address count information in LS is not changed, the channel sets a trigger to note that its LS buffer location is full, and it continues to request READ service from the central controls. When this continued request is granted priority the word in the LS buffer location is moved to its scheduled location in MS by a separate basic READ routine transfer and only then is the address count information incremented.

With each completed READ or WRITE transfer of a word a block length count quantity, also initially stored in LS during START I/O, is decremented. When the count length reaches zero the central system either initiates an END CHANNEL procedure to terminate further channel requests, or a DATA CHAINING procedure to start a new block transfer with a new length count and initial MS address, or a COMMAND CHAINING procedure to furnish a new control command (READ, WRITE, CONTROL I/O DEVICE, etc.) to the channel and thereby permit continued operation of the channel on other tasks.

In a block of WRITE transfers the channel requests call for basic WRITE routines which upon selection by the central system cause the central system to perform one of three basic routines; a transfer of a word from MS directly into the channel B register, via route 40, a word transfer from MS to the buffer location in LS assigned to the channel, via route 38A, or a transfer of the contents of the LS buffer location to the B register. For each transfer out of MS and MS address count and block length count are respectively incremented and decremented as for a READ block transfer.

Figure 12:
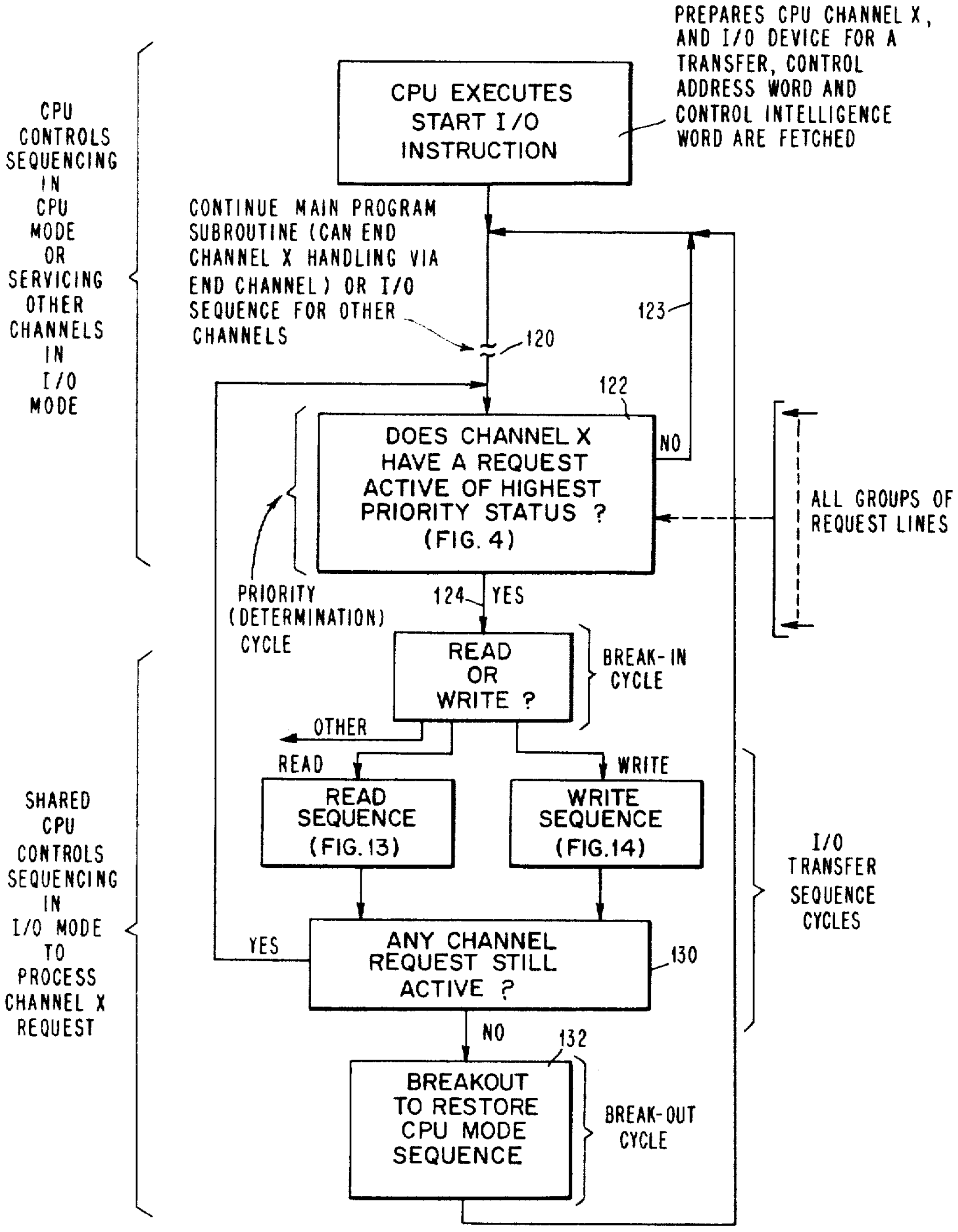
FIG. 12 is a diagram illustrating the sequence of operations performed by the central sequence controls in an exchange of information with a channel.

The sequence of operation of the central system during a block READ or WRITE transfer, relative to an arbitrary channed, denoted channel X, is charted in FIG. 12. Note particularly the indication at 120 that after executing the START I/O instruction relative to channel X the central system is effectively de-coupled from channel X and may proceed with internal processing under control of other program instructions, or with other information exchanging functions relative to other channels. Note also at 122 and 123 that if the channel X request for a basic routine when examined by the controls 21, does not have highest instantaneous priority status a higher priority request of another channel will be serviced, whereas (124) if the channel X request does have highest instantaneous priority it is serviced by a basic routine commencing in the very next CPU cycle (BREAK-IN cycle).

As indicated at 130 towards the end of each basic routine the central controls check for other active requests so that routines may be chained without the extra CPU mode restoration cycle (BREAK-OUT) at 132 and also avoiding an additional BREAK-IN cycle. Since time is of the essence in all transfers, it is noted that such saving of cycles in the frequently performed routine of FIG. 12 will yield an over-all savings of many cycles in the general performance of the system 20.

When the check 130 indicates an active request it is followed immediately by check 122 to determine if the request is a continuing request of channel X and if so whether it is a highest priority request at the moment in question. If it is highest it is serviced and if not the request of another channel is serviced during the time gap implied at 120. On the other hand, if no channel requests are active during check 130, the BREAK-OUT cycle 132 is followed, in time gap 120, by operations which represent a continuation of an interrupted CPU mode microsequence.

*Priority decision (FIG. 4)*

Figure 4:
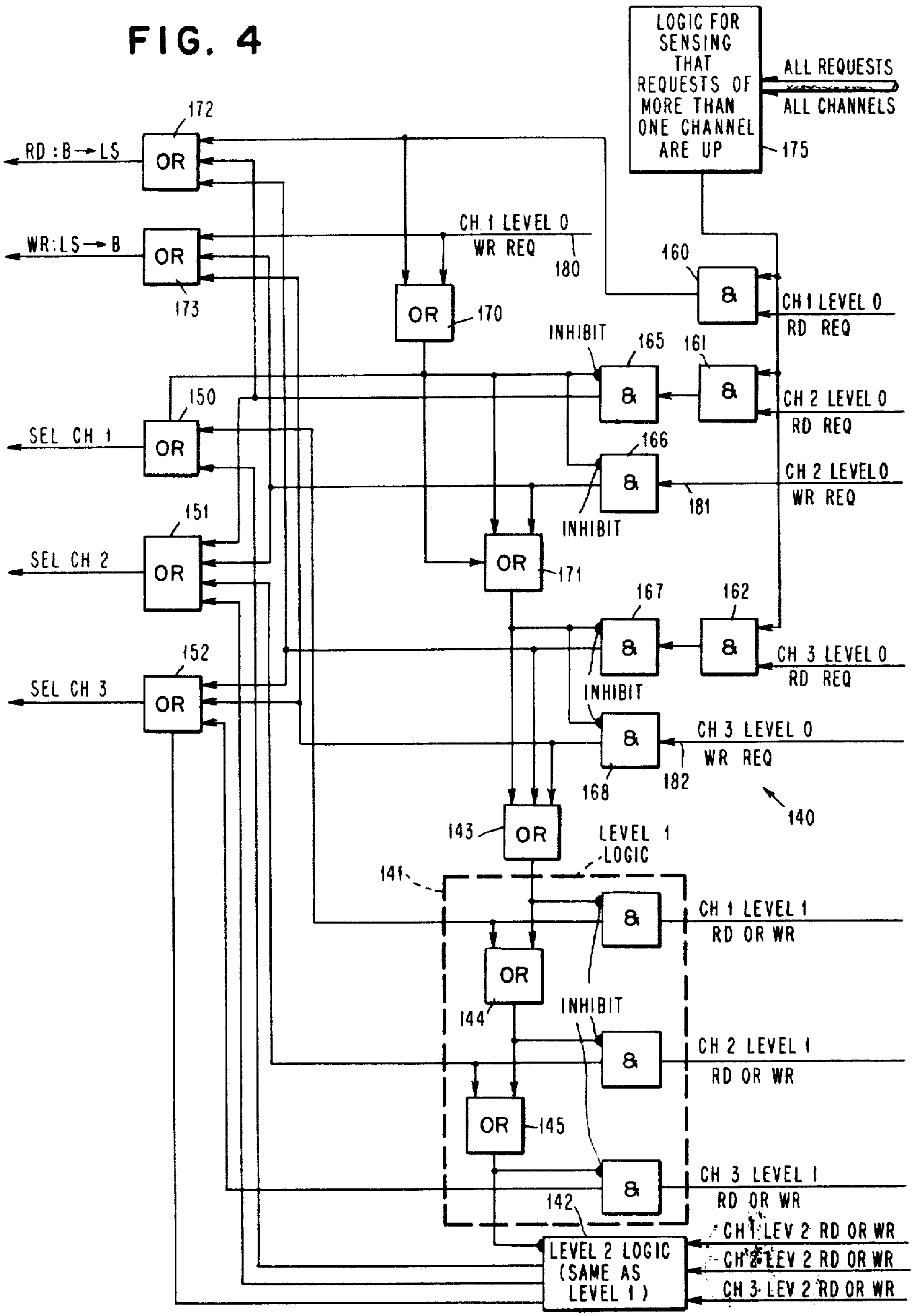
FIG. 4 is a schematic circuit diagram of the logical organization of the priority selection logic controlling assignments of connections between the common central unit of FIG. 2 and the individual channel units in the same figure, on a variable priority basis.

The priority determination check 122 is performed by the circuits 22 (FIG. 2) which are shown in greater detail in FIG. 4. These include groups of decision circuits 140, 141 and 142 for respective requests representing the 0, 1 and 2 priority levels. Any decision group detecting a priority request inhibits operation of all lower level groups via one or more of the OR-circuits 143, 144 and 145. Thus, if a highest level request (level 0) is presented to the circuits 140 all lower level decision circuits 141 and 142 are inhibited. If there is no level 0 request and circuit 141 detects a level 1 input it will energize OR-circuit 144 and/or OR-circuit 145 to suppress lowest level circuits 142 which internally are organized identically to the circuits 141.

Each of the circuits 140, 141 and 142 includes three groups of request inputs, one group from each channel, and contributes an output to each of three output circuits, represented by OR-circuits 150, 151, and 152. These OR-circuits provide outputs respectively denoted SELECT CHANNEL 1, SELECT CHANNEL 2, and SELECT CHANNEL 3. These signals are mutually exclusive and serve to direct the CPU controls to the appropriate channel while the CPU controls are executing the basic routine; i.e. after ROUTINE RECEIVED occurs as explained below.

Circuit 140 contains three preliminary gating AND circuits 160–162, four priority selection AND circuits 165–168, and four OR-circuits 170–173. AND circuits 160–162 receive level 0 READ requests from the three channels and, if enabled by circuit 175, pass the request on to the other parts of circuit 140. Circuit 175 is active if more than one channel has an active request, and comprises an elementary arrangement of AND and OR circuits for producing an output only in response to coincident request signals from two or more channels. It will be seen later that this arrangement of preliminary gating permits the route decision branching of the common controls to occur at an early enough time to eliminate an otherwise necessary but useless cycle of operation.

If a level 0 READ request is passed through one or more of the gates 160–162, or if a level 0 WRITE request is presented on one or more of the lines 180–182, the OR circuit 143 will be energized and inhibit both the level 1 and level 2 circuits 140 and 142. In addition any level 0 READ request passed by 160–162 energizes OR-circuit 172, and any level 0 WRITE request will energize OR-circuit 173.

An unsuppressed level 0 READ request, or a level 0 WRITE request from channel 1 operates OR-circuits 170 and 171 to inhibit AND circuits 165–168, and thereby suppress level 0 READ or WRITE requests from all other channels, as well as all lower level requests. An unsuppressed level 0 READ or WRITE request from channel 2 will suppress level 0 requests from channel 3 and all lower level requests, via OR-circuit 171. An unsuppressed level 0 request from channel 3 will suppress all lower level requests. Thus one, and only one, of the input lines extending to OR-circuits 172 and 173 can be energized at any one time and when energized the line carries the level 0 request of the channel having instantaneous highest priority. By inspection it may also be seen that one, and only one, of the input lines feeding OR-circuits 150–152 can be active at any instant of time, and that these lines are associated on a one-to-one basis with all channel requests.

The outputs of OR-circuits 150–152 indicate which of the three channels has instantaneous precedence. These outputs are staticized (by means discussed later) at ROUTINE RECEIVED time to indicate which channel is to be selected for service. For other than a level 0 request other staticized channel line conditions will indicate the direction of transfer to the common controls 50 (READ or WRITE) and yet other channel line conditions will furnish an initial routine address to the controls 50 to rapidly initiate the first control state of the appropriate routine. For an unsuppressed level 0 request OR-circuit 172 or 173 will produce an output which will respectively call for a short routine: READ B to LS or WRITE LS to B. Since the channels provide initial addresses only for long routines the outputs of OR-circuits 172 and 173 must be given special treatment by the controls 50 and 21 (FIG. 2) as explained later.

*Central controls*

Referring to FIGS. 9, 15, and 16, the central controls 50 include a capacitor Read Only Store (ROS) 200 of the type described in the article entitled, "Read Only Memory" by C. E. Owen et al. on pages 47–48 of the IBM Technical Disclosure Bulletin, Vol. 5, No. 8, dated January 1963. The controls also include a mode trigger 202, condition triggers 204, also known as STATS, and timing circuits 206. The circuits 206 produce five cyclic signals at the CPU frequency but phased with respect to the zero time reference of each CPU cycle, as shown in FIG. 15.

The ROS cooperates with a 12-bit address selection register (ROAR) 208 and output control information buffer register (ROSDR) 210 to cyclically select one of 2,816 ninety-bit control words in each CPU cycle and to enter the same in ROSDR. Each control word, known as a microinstruction, is set into ROSDR at sense STROBE time, just prior to the start of the next CPU cycle and controls the action of the CPU during the next cycle.

The state of the register ROAR is determined at SET REG time (zero time) and controls the state of ROSDR at the following SENSE STROBE time. Thus each entry into ROAR will usually control the activity of the CPU in the next consecutive cycle following the entry.

Each entry into ROAR is determined in one of several different ways by the inputs presented to gates 212 through a network of OR gates 214. Ordinarily the 12-bits presented to the OR network 214 are derived selectively through gates 216 from one or more sources including: a segment of the ROSDR, output conditions registered by selected condition STATS 204, selected program branching information (program instruction operation codes), and fixed sources of INTERRUPT addresses for control branching in response to program interruptions.

Whenever a channel request line is activated and the CPU is in a condition in which it is capable of responding a ROUTINE RECEIVED signal is issued by latch 219 (FIG. 16) with the timing and approximate duration shown at 220 in FIG. 15. This signal enables one of three groups of gates 221, 222 or 223 (FIG. 9), to pass initial routine address information to ROAR in place of the sequential entry which would otherwise have been passed to ROAR through gates 216. This initiates a microprogram routine of ROS which controls the basic READ or WRITE routine required to execute the request of the channel whose request has just been selected.

As implied in FIG. 16, by the condition labels applied to the control inputs of gates 227, 228 and 229, ROUTINE RECEIVED is set at ADDER LATCH TIME if one of the SELECT output lines of FIG. 4 is marked, and MS is not in its $R_1$ phase of operation (FIG. 5) and in addition the central controls of FIG. 9 are either in CPU mode or in the last cycle or the BREAK-OUT cycle of a previous I/O exchange routine (i.e. ROSDR contains the last microinstruction of a routine or a BREAK-OUT microinstruction). At such times the ROUTINE RECEIVED pulse straddles the DRIVE ARRAY and STROBE outputs of circuits 206 (FIG. 9). It may be seen by the conditions applied to AND gate 231 (FIG. 9) that MODE LATCH 202 (FIG. 9) is not set until SET REG time of the cycle following the rise of ROUTINE RECEIVED. Therefore if CPU mode is up when ROUTINE RECEIVED first occurs AND gate 233 (FIG. 9) will be excited inhibiting AND circuit 232 (FIG. 9) causing suppresison of the SENSE STROBE control of sense gates 234 (FIG. 9) which normally supply inputs to ROSDR, and instead forcing all zeros into the 90-bit register ROSDR.

The all zeros state of ROSDR produces a BREAK-IN cycle of control reaction within the CPU resulting in all housekeeping transfers required to prepare for the forthcoming routine. Basically this consists of a transfer of the R register contents (FIG. 7) to a predetermined location in LS, leaving R free to carry MS address and block count information, as well as the *I/O* data being processed to and from LS any routine.

Suppression of the sense line inupt to ROSDR during BREAK-IN, in effect causes the CPU to lose its last state. In order therefore to restore the address of this lost microinstruction to ROAR during the SET REG time of the BREAK-OUT cycle so that the CPU may immediately pick up where it left off as soon as it is restored to CPU mode, with one exception every CPU mode entry to ROAR is transferred via gate 240 (FIG. 9) to a BACK-UP register 241 (FIG. 9) at approximately ADDER LATCH TIME immediately following the transfer into ROAR. The exception occurs when the microinstruction in ROSDR in the cycle preceding BREAK-IN calls for the start of an MS cycle. Not only must this action be suppressed, but to restore this microinstruction after BREAK-OUT it is necessary to preserve its address (of the previous cycle) in register 241. Thus the state of ROAR in either the last or next to last CPU cycle preceding BREAK-IN will remain stored in register 241 until BREAK-OUT whereupon the same information is delivered back to ROAR via gates 242 (FIG. 9).

This same information being the address of the microinstruction suppressed by the BREAK-IN action, restores the CPU to its proper next sequential CPU mode state.

Referring to FIG. 9, so long as AND circuit 244 is energized (NOT ROUTINE RECEIVED and NOT BREAK-OUT state of ROSDR), gates 216 are enabled to pass sequential addresses to ROAR at the start of each CPU cycle.

When ROUTINE RECEIVED occurs gates 246, 248, 250, 231 and 233 are all conditioned. One and only one of the gates 246, 248 and 250 will then pas an input to ROAR at SET REG time of the next CPU cycle. Mode latch 202, if not already in *I/O* mode, will be set to that state, and if latch 202 is in CPU mode ROSDR will be forced to the BREAK-IN condition. If latch 202 is in CPU MODE at the start of ROUTINE RECEIVED gate 246 may be fully energized (opened) by a RD LS signal (RD: B to LS latched from FIG. 4). Gate 248 may be opened by WR LS (latched WR: LS to B, from FIG. 4), and gate 250 would be opened by the absence of both RD LS and WR LS sensed via NOT 252 and OR 256.

When opened, gate 246 conditions gate 221 to pass a predetermined address of a first microinstruction of a RD B to LS routine to ROAR. Similarly gate 248 would condition gates 222 to pass the predetermined address of the first microinstruction of a WR LS to B routine to ROAR. Gate 250 opened carries an address from the channel designated by the output of OR's 150–152 (FIG. 4) into ROAR to start one of the slower routines involving MS: RD B to MS, RD LS to MS, WR MS to B, or WR MS to LS.

During CPU mode cycles, with certain cycles excepted, each address entry to ROAR is also placed in BACK-UP REG 241 at approximately ADDER LATCH TIME, by the output of gate 258. The last or last but one ROAR entry in CPU mode prior to BREAK-IN specifies the microinstruction which is suppressed by the BREAK-IN output of gate 232, or respectively by the CANCEL MS START output of the AND circuit 259. This same entry is retained in register 241 until a BREAK-OUT cycle occurs without a ROUTINE RECEIVED. At the start of such a BREAK-OUT cycle gate 260 energizes gates 242 to restore the contents of register 241 to ROAR, so that in the very next cycle ROSDR assumes the state it would have been in had BREAK-IN not occurred.

Concentrating on AND circuit 258 and its inputs it is seen that this gate is conditioned in each CPU mode cycle slightly after the rise of the ADDER LATCH pulse (ADDER LATCH+) and permits the contents of ROAR to be placed in register 241 if AND circuit 259 is not energized. This AND circuit is energized in a CPU MODE cycle only if ROUTINE RECEIVED is active and an MS cycle is about to be started (by LOAD SAR). At such time the BREAK-IN cycle still follows the cycle of ROUTINE RECEIVED but the effect of the microinstruction held in ROSDR in the cycle preceding BREAK-IN (in addition to the microinstruction present on the ROS sense lines during BREAK-IN) is suppressed, and gate 258 is disabled. Thus register 241 preserves the address of the first suppressed microinstruction.

*Route decision* (*FIGS. 10, 11, 19*)

Referring to FIG. 19, the route decision made by the circuits 21 of FIG. 2 may be seen to involve a selection of one of 18 routine possibilities determined by which one of 18 AND circuits 300 happens to be enabled. For each channel there are six possibilities, three for READ routines and three for WRITE routines, depending upon which transfer path 40, 38A or 38B of FIG. 2 is selected. First and second groups of latches 304 and 305 are used to sample and hold certain conditions received from the priority circuit of FIG. 4 and the channels at or after ROUTINE RECEIVED time so that thereafter the signals available to the central controls are staticized during the routine branching based on these signals. RD LS and WR LS signals at the outputs 306 and 307 of latches 305, derived from microinstruction outputs of FIG. 9 control the special fast transfer (priority 0) routines associated with path 38B of FIG. 2. Corresponding signals sent by the selected channel to gates 246 and 248 (FIG.9) transfer initial addresses to ROAR which produce these microinstruction outputs. RD LS from 305 controls the uppermost three of the eighteen AND circuits 300 and WR LS controls the next three AND circuits following the uppermost three.

Each of the AND circuits of the group 300 is controlled by one of the latched select lines from 304 (SEL 1, SEL 2, or SEL 3) which designates the channel to be selected. In addition, the twelve lowermost AND circuits 300 are controlled in groups of six by a lower level READ selection signal (RD MS) and WRITE selection signal (WR MS) latched at 305 from particular microinstruction control fields produced after gates 223 (FIG. 9) supply a channel input to ROAR. It will be noted that the twelve lowermost AND circuits produce outputs which are used to control those transfer routines which involve slow speed transfers between the main store and either the local store or the channel internal B register. The six slow READ routines involving access to MS are controlled by the six uppermost AND circuits of the lower twelve, the uppermost three of these six controlling transfers from LS channel buffer positions to selected MS locations, and the next lower three controlling transfers from the B registers of respective channels to selected MS locations.

The lowermost six AND circuits 300 produce outputs which control writing of information between MS and either LS or channel internal B registers. The first three of these control transfers from MS to respective LS positions and the lowermost three AND circuits control transfers from MS to the B registers. It wil also be appreciated from the indication placed near arrow 312 in the lower left hand section of the drawing of FIG. 19 that the outputs of the circuits 300 are mutually exclusive and are selected during the execution of a basic microprogram transfer routine by the read only store controls of FIG. 9 as a result of information placed in the control register ROSDR at the start of the routine.

In addition to the SEL and RD MS or WR MS controls furnished to the lowermost twelve AND circuits 300, each of these AND circuits is controlled by at least one additional factor. The three AND circuits which produce the output for reading information from LS to MS are controlled by the full status of occupancy of the respective LS buffer position, indicated by the latched *I/O* STAT 3 SET condition. In the discussion of FIG. 21 it will be shown that this condition is set at ROUTINE RECEIVED time only if the LS position is full. The AND circuits 300 which control reading of information from the channel B register to MS require an indication furnished by the output of NOT circuits 314 that the higher priority reading path between the B register and local store has not been selected by RD LS, and further that the respective local store position of the associated channel is not full; the latter represented by *I/O* STAT 3 NOT SET. The three AND circuits which control writing of information between MS and LS are controlled by the combination of WR MS, respective select (SEL) signals, NOT WR LS (output of NOT circuit 316) and *I/O* STAT 2 NOT SET. FIG. 21 indicates that *I/O* STAT 2 is set at ROUTINE RECEIVED time only if the channel LS position is vacant and B and C are not simultaneously occupied; i.e. only when the channel is in a position to accept a transfer from MS, as will be clear from an inspection of FIG. 11. Thus *I/O* STAT 2 NOT SET means that the information should be transferred to LS, a non-zero level WR request is active. Finally, the three lowermost AND circuits which control the writing of information between MS and the Channel B registers are controlled by WR, *I/O* STAT 2 SET, and individual SEL connections. Since STAT 2 is set only when LS is vacant (LSV) it will be seen that WR LS cannot be active at such times.

Thus it will be appreciated that when line 306 or 307 is energized a READ routine or WRITE routine between the channel internal register and the associated LS position will take place, depending respectively upon which line, 306 or 307 is marked, and the particular channel selected will be determined by one of the three select lines SEL 1, SEL 2, and SEL 3.

It will be seen that when the lines 306 and 307 are both inactive, the transfer selected will be determined by one of the 12 lower AND circuits of the group 300. The slow READ transfers from LS to MS are negotiated only when the local store buffer position is full, and under such circumstances the line 306 will never be energized, because of the organization of the channels. More specifically, a channel will not issue a level 0 READ or WRITE request which can pass through the circuits of FIG. 4 unless its LS position happens to be respectively vacant or occupied, the channel having an internal trigger which indicates such status. Thus it is not necessary to connect the output of NOT circuits 314 and 316 to those six of the AND circuits 300 which control LS to MS and MS to B transfers. However, if the B register is vacant at that instant the gates 104 will be opened permitting the information entering LS to also enter the B register of the channel. The channel may then set its B register status trigger to the full condition, and also raise a level 2 request calling for filling of the LS position by another word from MS. The channel will also fail to set its LS status and thereby prevent a subsequent LS to B transfer of the information already secured in B. With LS status at vacant even though LS contains the same information as B it is, in effect, vacant.

Figure 13:
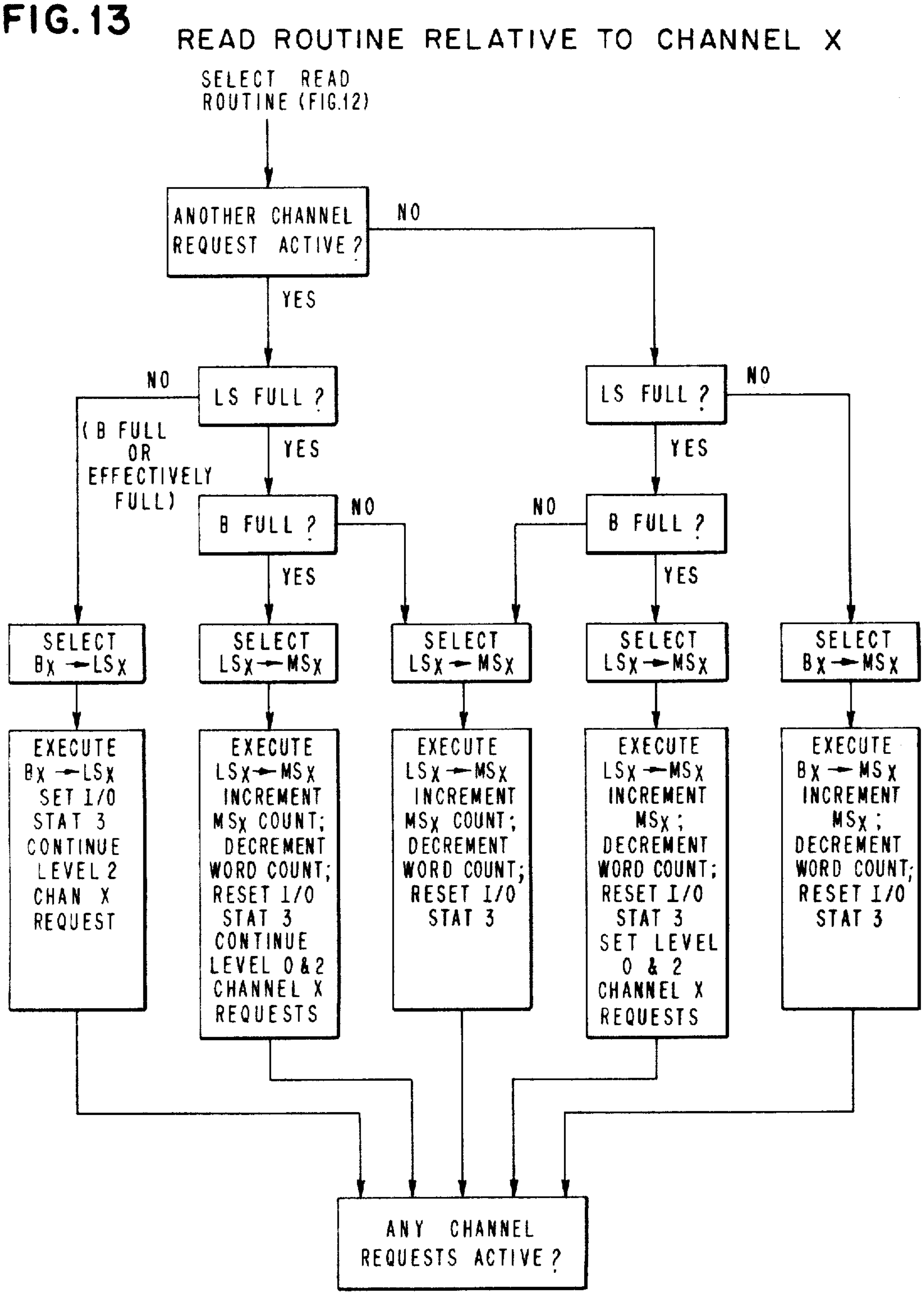
FIG. 13 is a diagram illustrating the sequence of elemental operations performed by the central system in a basic READ routine.

The operations just described above are tabulated in the READ and WRITE tables of FIGS. 10 and 11 respectively, which when considered in connection with the notes therein are believed to be self-explanatory. An important point to note is that the channel requests vary as a function of the condition of occupancy of the LS, B and C buffers, and that the route selection is determined by the activity in other than the selected channel. The sequence of operations performed during a routine are generally described in FIG. 13 for READ routines and FIG. 14 for WRITE routines. These figures are also believed to be self explanatory. The number of cycles and particular actions involved in each transfer will be discussed below.

FIG. 17 illustrates a simple READ routine of the central controls (FIG. 9) preceded and followed by internal processing operations conducted in CPU mode. It is seen that this routine consists of a BREAK-IN cycle, followed by four routine cycles, in turn followed by a BREAK-OUT cycle, and finally a RETURN TO CPU MODE operation. The channel serviced during this routine, identified as channel X, issues its READ request (level 0 and level 2 raised) in the cycle before BREAK-IN and is immediately granted priority (provided that MS is not in $R_1$ phase). While the controls in FIG. 9 are performing an ordinary CPU mode function during the cycle before BREAK-IN, the priority circuits are free to determine priority of requests. Since channel X is the only channel seeking service, its level 2 request is selected by the circuits of FIG. 4 and passed on to the ROUTINE RECEIVED logic of FIG. 16 to establish the ROUTINE RECEIVED condition. Meanwhile, the channel X RD request and other conditions (SEL CH2 and status of *I/O* STAT 3) are latched by the route selection circuitry of FIG. 19. In the BREAK-IN cycle *I/O* MODE is set (FIG. 9), ROSDR (FIG. 9) is set to the all-zeroes BREAK-IN state, and ROAR is set to the address of the initial microinstruction of the transfer routine by operation of gates 221, 222, or 223, of FIG. 9. During the cycle prior to BREAK-IN the last entry to ROAR has been stored in the back-up register 241 of FIG. 9 and is thereby secured since further entries to register 241 are blocked by *I/O* MODE.

It will be recalled that ROUTINE RECEIVED will not be issued unless MS is not in its $R_1$ phase of operation. The reason for this is that in order to be able to restore the CPU conditions of the cycle preceding BREAK-IN, upon the subsequent BREAK-OUT and return to CPU MODE, all transactions between the CPU and MS which had been initiated prior to BREAK-IN must be completed. An MS cycle is started by a ROSDR microinstruction determined in the previous CPU cycle and once started cannot be stopped by the CPU controls. Thus, the contents of SDR in the $R_2$ cycle would inevitably be stored in the MS address selected at the start, and could not be blocked even though the contents are incorrect due to the CPU interruption (BREAK-IN). Thus, a BREAK-IN cycle cannot follow an $R_1$ cycle of MS. It will also be appreciated that any exchange between the CPU and SDR is completed during the $R_2$ cycle of MS, at which time either fetched contents of MS are taken from SDR to an appropriate CPU register position external to MS or information being stored in MS is secured in SDR and thereby effectively secured in MS. Hence, it may be seen that all actions of the CPU are completed if in the worst case during the priority determining cycle in which ROUTINE RECEIVED is issued MS is in its $R_2$ phase.

Assuming then that MS is in the worst case phase $R_2$ during the priority cycle, it follows that in the BREAK-IN cycle MS will be in its $W_1$ phase, and in the first cycle of the *I/O* transfer routine MS will be in its $W_2$ phase of action. Consequently, the signal to start a new MS cycle and load SAR cannot be given by the microprogram controls of FIG. 9 to MS until the second cycle of the *I/O* routine. For this reason the signal to start MS is given (340, FIG. 17) in the second cycle of the *I/O* transfer routine and, as indicated at 342 (FIG. 17) the MS address register and SAR will be set at the beginning of the third cycle of the *I/O* transfer routine with information extracted from an MS address register in LS during the previous cycle. Since a transfer between a channel B register and MS is effectively completed (344) by the transfer of the B register information into SDR in the $R_2$ cycle, the handling from SDR to the internal location specified by SAR being under the exclusive internal control of MS, the *I/O* routine may be terminated after the fourth ($R_2$) cycle.

During the second and third cycles of the I/O routine the microinstructions placed in ROSDR control the housekeeping activities required to decrement the word count and increment the MS address count associated with the word of information being transferred. These activities involve extraction from LS, processing of these items through the CPU adder and storage of the up-dated items back in LS.

Indirect READ transfers are characterized in FIG. 18 wherein a channel X READ request 360 is serviced while a channel Y request 362 is active. The ROUTINE RECEIVED for the channel X request occurs (364) during a CPU mode cycle. A BREAK-IN cycle 366 follows during which the X routine address is placed in ROAR at 368.

Referring briefly to the table in FIG. 10, it may be seen that channel X will have at least a level 2 request active at ROUTINE RECEIVED time. If in addition the internal B register (B*x*) of the channel is full, or effectively full (C*x* FULL), and the LS position (LS*x*) is vacant, the channel will also have an active level 0 request.

It may also be recalled from the description of FIG. 4 that a level 0 RD request is suppressed in the absence of requests from other channels. Since channel Y has an active request at the time 364 of priority determination, the 0 level request of channel X is not blocked in the circuits of FIG. 4, and is granted priority. This sets RD LS (FIG. 4) and therefore conditions the circuits of FIG. 9 to enter the initial address of a RD B to LS routine into ROAR at BREAK-IN time. As indicated at 370 the RD B to LS routine takes place in the cycle immediately following BREAK-IN and is a single cycle routine. During this same cycle, as shown at 374, the request of channel Y is given a ROUTINE RECEIVED and in the very next cycle the initial address of the Y routine is entered into ROAR, without an intervening BREAK-OUT cycle, as shown at 378.

In the meantime, the channel X READ request calling for continued movement of the channel X information from LS to MS has been raised (380) and therefore upon conclusion of the Y routine, and perhaps of the other routines as suggested by the gap 382, the channel X routine received is processed. It may be noted that although the X routine for RD B to LS involves only one cycle of activity it lasts two cycles. This is because the information placed in ROAR at 378 does not go into effect until the next cycle and therefore in effect the cycle of action is a wasted cycle. While ROUTINE RECEIVED 384 is up the last cycle of the Y routine is being executed. Thus the last Y routine cycle coincides with the placement of the X routine information in ROAR at 386. MS cannot be started up until the end of the second cycle after termination of the Y routine, as indicated at 390 and LS cannot supply information to SDR until one cycle later at 392. As indicated at 394 alternatively other routines can be chained without BREAK-OUT, or a BREAK-OUT cycle can be started.

It will be noted that the BREAK-OUT cycle occurs five cycles after the last step of the Y routine; i.e. that the X routine for the local store to main store transfer is five cycles long as compared to the four cycle transfer described in FIG. 17. The reason for this provision of a costly extra cycle is that the housekeeping which normally overlaps the transfer operations cannot be accomplished during an LS to MS exchange since the only register available for communicating with LS after BREAK-IN is the R register (that being the only register cleared during the BREAK-IN procedure). When the LS to MS transfer and associated housekeeping operations overlap in time it is necessary to provide an extra cycle of operation to clear an additional CPU register (the L register, FIG. 7).

For convenient reference, FIG. 20 has been supplied to permit the various RD and WR routines to be contrasted. It may be seen from FIGS. 17, 18 and 20 that an ordinary unchained direct transfer routine requires four cycles of CPU activity in I/O mode exclusive of the BREAK-IN and BREAK-OUT cycles, whereas an indirect transfer routine, of any particular channel, with or without other routines interleaved by chaining, as indicated at 400 in FIG. 20, requires a minimum of seven cycles of CPU activity in I/O mode for completion.

Figure 14:
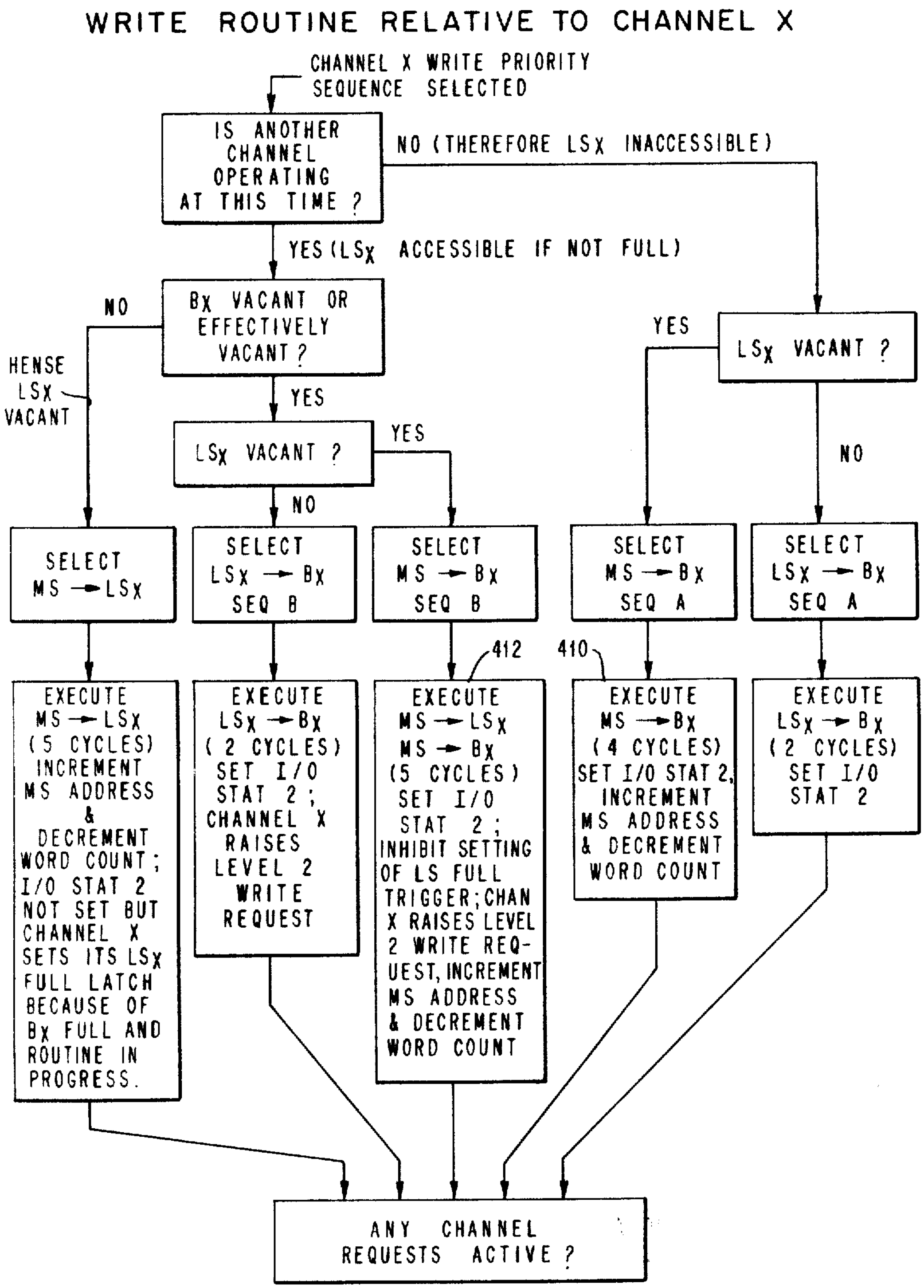
FIG. 14 is a diagram illustrating the sequence of elemental operations performed by the sequence controls of the central system in connection with a basic WRITE routine.

The direct WR routine shown at 402 in FIG. 20 requires four cycles of CPU activity in I/O MODE exclusive of the BREAK-IN and BREAK-OUT cycles which is the same as the number of cycles required for a direct RD routine. Actually, referring to FIG. 14 it may be seen that an MS to B WR routine may take either four or five cycles, depending upon whether the routine 410 or 412 of FIG. 14 is executed. The reason for the longer routine 412 is that under the indicated circumstances the information was originally scheduled to go to LS and, as previously mentioned, the MS to LS transfer requires five cycles.

It may be noted that in a four cycle WR routine the information taken out of MS is not set into the channel B register until SET REG time of the BREAK-OUT cycle. However, the controls at the time of BREAK-OUT are actually operating upon the microinstruction contained in ROSDR during the previous cycle and therefore no additional cycle would be required. It may further be noted from FIG. 20 that a WR routine through the indirect route takes seven cycles exclusive of BREAK-IN and BREAK-OUT and therefore, represents a three cycle increase over the ordinary four cycle WR routine, or a two cycle increase over the exceptional five cycle MS to B WR routine. At the very least, therefore, an indirect route RD or WR transfer takes a minimum of two extra cycles of CPU activity in I/O MODE.

It has therefore been shown that the present invention functions to provide a fast transfer service between a speedily accessible small capacity local buffer store and several simultaneously operating channel units which is followed (for RD) or preceded (for WR) by a slow transfer between the local store and a relatively large capacity, slow access main store. The combined transfers between main store and local store and between local store and channels require more cycles of activity of the common central controls than are required for a direct transfer between the same main store and channels, but offers the advantage of speeding up the service to the channels when requests of several channels are simultaneously active. It may be appreciated that when requests of plural channels are not simultaneously active it would be desirable to service them over the shorter direct route so that the burden placed on the shared central controls is then minimized. This, in fact, is done for RD requests. However, it cannot be done for WR requests since information is written into LS only in anticipation of the possibility of future request conflicts. Thus, even if the conflict fails to materialize the indirect route transfer cannot be avoided.

Another point to note is that the competition between channels for the service of the central system is variable, and any channel is allowed to gain precedence over any other channel depending upon its curret needs. Nevertheless, whenever several channels compete simultaneously for access since the priority and route selection is varied conditionally upon actual or anticipated request conflicts, even the non-selected requests influence the central equipment, and thereby in effect speed up the time at which they will be serviced.

*Request logic*

Figure 21A:
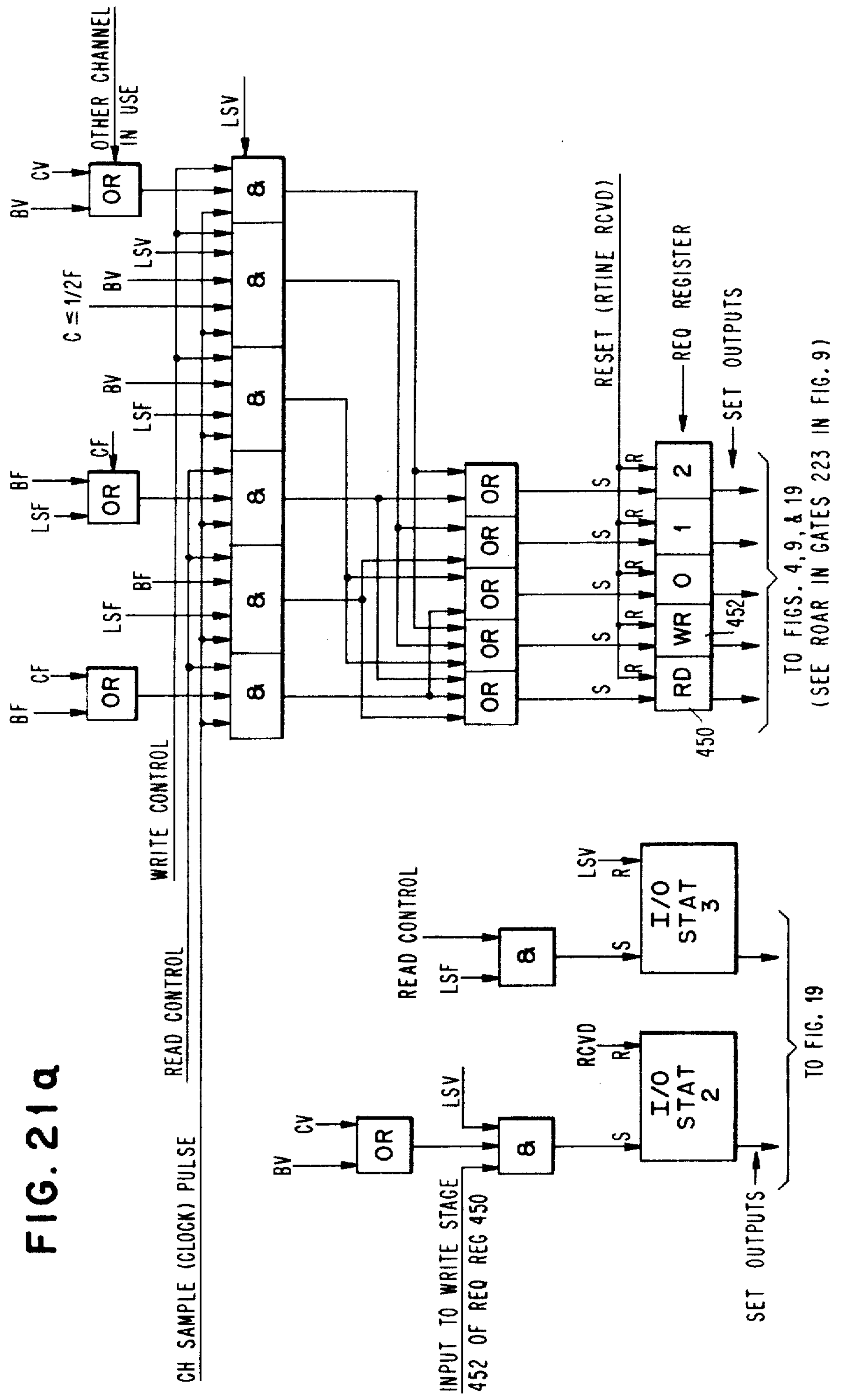
Figure 21B:
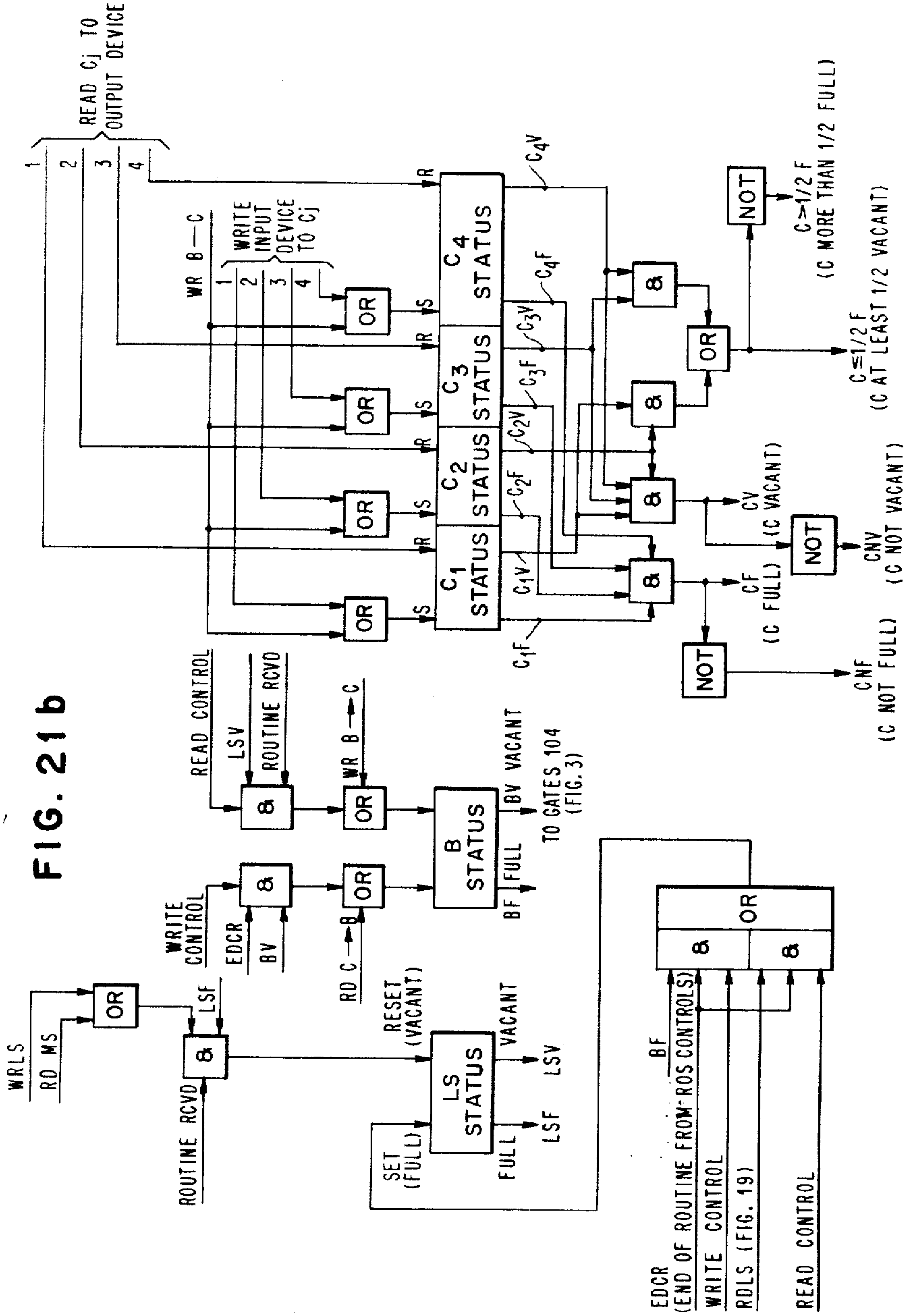

Referring now to FIGS. 21*a* and 21*b* it is seen that the channel controls include a request register 450, having positions RD, WR, 0, 1, 2, 3. RD and WR when set denote requests to the central controls of FIGS. 4 and 19 for reading and writing routines. 0, 1, 2, and 3 denote the priority levels of such requests. Upon selection, the contents of register 450 are passed to ROAR INGATES 223 (FIG. 9) for entry into ROAR if other than a level 0 request is issued.

Also shown in FIGS. 21*a* and *b*, are the I/O STATS 2 and 3 and status triggers for LS, B, and C registers individual to the channel. The C status is registered for each byte of C, by $C_1$, $C_2$, $C_3$, and $C_4$ status triggers.

LS Status is set to FULL (LSF) by coincidence of EOCR (end of common routine) and either B FULL (BF) and WRITE CONTROL (from channel) or RDLS (lever 0 read) and READ CONTROL; indicating that LS will be filled if a WRITE routine request is acted upon and B is full, or a RDLS (read B to LS) request is acted upon. LSC (LS vacant) is set by coincidence of LSF and ROUTINE RECEIVED indicating that if LS is full and a routine is executed in either the READ or WRITE direction the routine must vacate LS (i.e., for each channel LS evacuation when required takes precedence over all other transfers of the same channel).

BF (B full) is set by an internal READ signal accompanying a C to B transfer (RD C to B) or as a consequence of execution of a WRITE transfer while B is vacant (BV). As previously mentioned, a WRITE transfer from MS to LS will be effectively diverted to a WRITE from MS to B if B is vacant when the transfer actually takes place. At such times LS status will not be set to LSF since the LSF setting AND circuit controlled by BF will not be armed.

BV is set by an internal WRITE transfer from B to C or as a consequence of a READ transfer routine coinciding with LSV status (if LS is vacant the transfer must be from B to LS or B to MS; in either case, B will be vacated).

$C_{1-4}$ status triggers are set jointly to full status by WR B to C (internal channel transfer of a word from B to C) and individually to full or vacant status as a byte is passed respectively to or from $C_{1-4}$ respectively from or to a respective input or output device.

The status of C is indicated to be full (CF) when $C_{1-4}$ are all full $(C_1F \cdot C_2F \cdot C_3F \cdot C_4F)$ and vacant (CV) when $C_{1-4}$ are all vacant $(C_1V \cdot C_2V \cdot C_3V \cdot C_4V)$. C is indicated to be not full (CNF) when CF is not active, and C is not vacant (CNV) when CV is inactive. C is indicated to be one-half or less full $(C \leq \frac{1}{2}F)$ when at least two byte positions are not filled. Since bytes are entered or removed from left to right or right to left, this can be detected by noting the conditions of $C_1$ and $C_2$ or of $C_3$ and $C_4$ $(C_1V \cdot C_2V + C_3V \cdot C_4V)$. The complement $\overline{(C_1V \cdot C_2V + C_3V \cdot C_4V)}$ is then taken to indicate that C is more than one-half full $(C > \frac{1}{2}F)$.

At frequent instants determined by the channel internal controls, the request register 450 and *I/O* stat 2 or 3, are set in accordance with a logic function of the status trigger conditions. Stat 2 is set if a WRITE operation is in progress and stat 3 is set for READ operations. STAT 2 is set if the input to WR request 452 of register 50 is active and status LSV is set and status BV or CV is set. Thus, if during a WRITE operation LS is vacant and B is either vacant (BV) or effectively vacant (CV), the transfer to follow will move a word from MS to B (see FIG. 11) and *I/O* STAT 2 will provide advance control (through the circuits of FIG. 19) for selecting the MS to B route in preference to the longer MS to LS route.

I/O STAT 3 is set after a B to LLS transfer has been negotiated (READ CONTROL·LSF) and thereafter provides advance notice to the central route selection circuits to control sequence branching requisite to selection of the LS to MS route when the next READ request of this channel is selected. STAT 3 is then reset by LSV.

In register 450, RD is set during a READ operation (READ CONTROL) whenever any priority level stage (level 0, 1, or 2) is being conditioned. Conversely WR is set for WRITE CONTROL and conditioning of a level 0, 1, or 2 set input.

Level 0 set input is conditioned by an internal request sampling (or clocking) pulse of the channel occurring either together with READ CONTROL and LSV and B effectively full $(BF+CF)$, or together with WRITE CONTROL and LSF. Thus, a level 0, RD request is issued when LS is available and B is effectively full and a level 0 WRITE request is issued if LS is full. It will be recalled that a level 0 RD request is passed conditionally by the priority circuit of FIG. 4 only when another channel has an active request, and a level 0 WR request is handled unconditionally by the same circuits. Thus, either a B to LS or B to MS transfer routine may be executed after a level 0 RD request is raised, whereas a level 0 WR request always calls for an LS to B transfer routine.

The level 2 request input is set by the channel internal sampling pulse in combination either with READ CONTROL and LSF or B effectively full (BF or CF), or with WRITE CONTROL and LSV and OTHER CHANNEL IN USE or B effectively vacant (BV or CV). Thus, a level 2 RD request is issued whenever LS or B is full or B is expected (CF) to shortly be filled (look-ahead) and a level 2 WR request is forwarded to the central controls whenever the LS position is vacant and conditions warrant either an MS to LS or MS to B transfer. The WRITE routine selected in response to a level 2 WR request therefore is either MS to LS or MS to B, or MS to both LS and B as previously explained (see FIG. 14). MS to LS or MS to both LS and B are selected when level 2 WR and STAT 2 are respectively set and reset at the time of a ROUTINE RECEIVED. Note that when B is effectively full $(\overline{\text{BV or CV}})$, level 2 WR is set only if another channel is in use.

The level 1 set input is conditioned by the channel sampling pulse in combination with either the group: READ CONTROL and LSF and BF; or the group: WRITE CONTROL and LSV and BV and $C \leqslant \frac{1}{2}F$. Thus, a level 1 RD request indicates that both LS and B are full and that LS requires immediate evacuation if no level 0 request of another channel is pending. A level 1 WR request signifies that the entire channel queue is almost completely vacant $(BV \cdot LSV \cdot C \leqslant \frac{1}{2}F)$ and that B therefore requires a word from MS as soon as possible (i.e. if no level 0 request of another channel is active).

*Discussion*

It should be noted that the likelihood of conflicts represented by coinciding requests of asynchronously functioning channels is small and represents a special case. In general, at priority determination (ROUTINE RECEIVED) time only a single channel will be active. Theoretically, since a channel is serviced in four CPU cycles (2 microseconds) when not in conflict it would seem to be possible for one channel to carry information at a 500,000 word-per-second rate or for three channels simultaneously to carry information recurring at approximately a 166,000 word-per-second rate. However, this would be true only if the information transfer request of the three channels were locked in phase. This is impossible in any practical (asynchronous) system.

An order of improvement is realized by the variable priority selection disclosed herein; but even a variable priority organization may not provide a fair distribution of attention to simultaneously requests of highest precedence level since the highest priority channel would then out-rank the others, even though its level 0 request might be slightly behind the others in phase. As indicated above, this situation rarely occurs, but since it is possible it must be taken into account in the design and therefore a safety factor (reduction in maximum word handling rate) is usually introduced as part of the channel *I/O* interface design specification. We, however, have observed that an order of improvement in design restrictions could be realized by selectively adding an indirect LS routing facility in just such circumstances. We have observed further that the worst case situation actually occurs when at request sampling time the channel having the most recently initiated highest level request "beats out" another channel whose highest level request has been pending for an interval of time such that if not answered within a predetermined minimum time loss of information to the channel or central system could result. In effect, the indirect route provided herein essentially cuts in half this minimum "information will be lost if nothing is done" time by temporarily providing an extra buffer register (LS) in the channel information movement path (queue) at the rate moments of conflict.

It will be noted that WRITE transfers from MS to LS have low level 2 priority (since B is full when such transfers occur). Hence, such transfers will not occur at moments of high priority conflict, and will not interfere with functions of other channels, Likewise READ transfers from LS to MS have low level 1 or 2 priority because of the associated channel buffer conditions. Consequently, only indirect transfer movements between channel B registers and LS positions can be selected during the worst case (level 0) priority conflicts and each such movement reduces the time of response to the next highest priority non-selected request by only two GPU cycles (one microsecond). The additional three cycles added to the total transfer time (two cycles for the transfer between LS and B and one extra cycle for the fifth cycle of the MS–LS exchange) do not inconvenience the competing channels but rather they represent an extra three cycles of interference with ordinary low level (1 or 2) channel exchanges and also with internal CPU MODE processing activities. This additional time therefore need not be taken into account in determining the maximum information rate which can be handled by the channels.

The worst and most unlikely case occurs if all (three) channels simultaneously have active level 0 READ and/or WRITE requests. In this case, all three requests are serviced rapidly by LS B exchanges and lower level requests are thereafter raised for MS LS READ and/or WRITE exchanges. Should any channel then require level 0 service before the lower level (MS LS) transfers are completed, the level 0 would take priority and receive first attention. Should such a channel fall behind the others in having its level 2 (MS–LS) request handled because of a priority disadvantage, its level 1 request would improve its status. Thus, worst case interference with a level 0 request would be at most the time required to service a lower level request of another channel (i.e. five CPU cycles). It may be seen, therefore, that conflict situations occur infrequently and that the LS–B exchanges represent practically negligible additional interference to the other channel request handling functions, and but slight additional interference with (delay of) internal processing functions of the central system.

One last but interesting point to note is that each LS–B exchange not only reduces the interference imposed on waiting (not selected) channels, but also relieves the selected channel at an earlier time than in an MS exchange (cycle 1 of the routine rather than in a later cycle of the routine).

While the invention has been particularly shown and described with reference to a preferred embodiment thereof, it will be understood by those skilled in the art that various changes in form and details may be made therein without departing from the spirit and scope of the invention.

What is claimed is:

1. A selecting system comprising:
plural elements to be selected;
priority selection means responsive to a plurality of different categories of demand signals for selecting said elements according to a predetermined plan of priority based on a ranking of said categories;
and means individual to said elements for controlling the elements to transmit demand signals of different category selectively to said priority selection means as a function of instantaneous conditions detected internally by the respective elements.

2. A selecting system according to claim 1 in which:
said selection means is further controlled by sampling pulses, and
said individual controlling means are operable continuously, and capable of instantaneously varying the categories of signals presented to said selection means at any time prior to occurrence of a said sampling pulse.

3. A system for selectively controlling access of a plurality of individual signalling equipments to common signal handling apparatus comprising:
a plurality of means individual to said equipments each operable to produce demand signals of a plurality of different kinds including at least a first kind and a second kind; and
means shared by all equipments and operable under control of said common apparatus in response to the instantaneous outputs of the demand signal producing means to select one of said equipments;
means to condition said common apparatus for an exchange of information with the selected equipment, and
means to condition the individual demand signal producing means associated with the selected equipment to modify its current output of demand signals;
said equipment selecting means being effective to condition its selection of said equipment, when a plurality of request signals are coincidentally active, upon a plurality of precedence determining factors including the kinds of demand signals instantaneously active and a predetermined precedence status of the equipments associated with the said active signals.

4. In an electronic data processing system including a main internal store, a central processing unit and a plurality of channel units for conveying information in an asynchronous manner between multiple input/output devices and said internal store, the combination of:
means individual to each said channel unit for selectively issuing at least two different classes of demand signals representing requests for access to said store;
other means individual to each said channel unit for conditioning the associated demand signal producing means to produce said demand signals of different class selectively as a function of certain conditions internal to the associated channel unit; and
means common to all of said channel units for controlling transfers of intelligence between said channel units and internal store in response to the instantaneous conditions of all demand signals;
said common means being responsive in a predetermined order of precedence to demand signals of different class.

5. A system according to claim 4 wherein:
said common means is controlled by sampling clock pulses; and
said means individual to each said channel for conditioning the demand signal producing means is operative continuously effectively up to the moment of sampling to vary the conditions presented to said common control means, thereby increasing the likelihood that the associated channel unit will receive attention if its immediate needs become more urgent.

6. In an electronic data processing system including a main internal store, a central processing unit, and a plurality of channel units each inter-communicating information between said internal store and at least one input/output device, said channel units each including a plurality of buffer registers connected in cascade to temporarily queue up information passing asynchronously between an input/output device and said main store, the combination of:
means individual to each said channel unit for selectively producing a plurality of different classes of demand signals representing requests on behalf of the associated channel unit for access to said internal store to effect transfer of information relative to said store;
other means individual to each said channel unit for conditioning the associated demand signal producing means to vary the class of demand signals produced therein in accordance with the instantaneous condition of selected ones of the said buffer registers of the associated channel unit; and
means controlled by clock pulses operable to select a particular channel unit for coupling to said store in response to the instantaneous conditions of all said demand signals, said last mentioned means being responsive in a predetermined order of precedence to demand signals of different class.

7. In an electronic data processing system including a main internal store, a central processing unit, and a plurality of input/output channel units, a variable priority system for transferring intelligence selectively from the main store to a demanding channel unit comprising:

means individual to each channel unit, including a plurality of buffer registers connected in cascade, for carrying information progressively from the main store through the channel unit toward an output device linked to said channel unit;

means individual to said buffer registers for producing status indications representing the conditions of vacancy of the respective buffer registers;

means individual to each channel unit responsive to said status indications for selectively producing different classes of signals which represent calling requests for transfer of a unit of information over at least a segment of a path connecting said store to the associated channel;

and means associated with said central processor unit responsive to the request signals of all channel units to select one unit for a said information transfer operation in accordance with assignments of different predetermined priority ratings to the different classes of request signals and also to the channel units for distinguishing between requests of like class.

8. A system as characterized in claim 7 wherein:

said request signal producing means is responsive to said vacancy indications to anticipate effective vacancy or occupancy of a said buffer register before said register is actually vacant or occupied, respectively.

9. In a data processing system, the combination of:

a plurality of channel units;

a central data processing station including a main store;

means for transferring information from said channel units to said central station;

means individual to said channel units for producing demand signals in a plurality of different categories;

means responsive to said demand signals for selecting demands of said channel units according to a predetermined priority function of said categories; and means responsive to said selecting means for actuating said transfer means to transfer a unit of information over at least a segment of a transfer path extending from the channel issuing the selected demand to said main store.

10. In a data processing system, the combination of:

a plurality of channel units;

a central data processing station including a main store having an access cycle of first predetermined duration and a local buffer store having an access cycle of second predetermined duration less than said first duration;

means individual to each channel for selectively producing a plurality of demand signals of different classification;

means in said central station for selecting said demand signals in a predetermined priority sequence;

means in said central station responsive to a selected demand signal of one particular classification to directly link the associated channel unit to said main store for transfer of a unit of information in a transfer routine occupying an interval at least as long as said first duration;

means in said central station responsive alternatively to actual and anticipated simultaneous operation of a plurality of said channel units for actuating said transfer control means following a selection of a said demand signal to transfer information over a special path between said associated channel unit and main store in a plurality of discrete operations; said special path including one fast action segment linking said channels and local store in one discrete operation in response to selection of a one demand of said associated channel unit and another slower action segment linking said local store and main store in another discrete operation in response to selection of another demand of the same associated channel unit; said another demand having a lesser priority status than said one demand.

11. In a data processor including plural channel units, a central processor, and a main central store, a variable priority exchange system comprising:

first means individual to each channel for setting up different classes of request signals each calling for transfer of a unit of data over at least a portion of a path linking said main store and channel units;

second means individual to each channel for periodically conditioning said setting up means to selectively set up said requests as a function of conditions internal to the associated channel;

first means common to all channel units for selecting said requests in a predetermined priority sequence; and second means common to all channel units coupled to said first common means and channel units for effecting a said transfer of a said unit of data over a said path portion.

12. A system according to claim 11, said second means including:

means for variably selecting a said portion of a said path in accordance with the class of the request selected by said first means.

13. In an information exchange system including a central data handling station and individual data handling stations communicating with the central station on an asynchronous priority demand basis; said central station including controls for handling ordinary transfers of information between said individual stations and said central station in access cycles of predetermined duration during which predetermined housekeeping functions are performed to maintain an account of each transfer transaction, as well as to route each item of information to an appropriate destination in said central station, a system for handling special worst-case demand situations comprising:

a local buffer store having an access cycle of duration less than the durations of said predetermined access cycles of ordinary handling;

means responsive to a plurality of simultaneous demands from a plurality of said individual stations for operating the controls of said central station to transfer information between said local buffer store and said individual stations in said cycles of lesser duration, omitting said housekeeping functions; and means operable either prior to or subsequent to said last-mentioned transfer, in response to a channel demand of lesser priority, to operate the central controls to transfer the same information between said local store and central station and to perform the ordinary housekeeping accounting functions associated with the direct transfers of information directly between the said individual station and said central station.

14. In a data processing system, the combination of:

a plurality of channel units; each having variable priority signaling means for selectively producing a plurality of transfer demands of different category;

a central processing system including a main store and local store having respective first and second predetermined access cycles, said second predetermined access cycle being of shorter duration than said first access cycle;

said central system further including cyclically operable sequence control means operable to control all transfers of information relative to said main store, both for internal processing functions of said central system and for exchanges of information between said central system and said individual channel units, said control means being responsive to transfer demands of said channel units within a single cycle of operation thereof, when engaged in controlling internal processing functions; said control means responding by interrupting said internal processing functions and by connecting a channel unit having instantaneous highest priority to said central system for a transfer of a unit of information relative to a path linked to said main store;

said transfer connecting means being responsive to transfer demand signals of different category from said channel units to vary the order of priority of selection of said channel units for said transfers; and said central system including further control means responsive to simultaneous demands of like category from a plurality of different channel units to select the demand of a channel unit having a highest fixed rank for attention; said further control means being operable when the category of said demands of like category is a predetermined highest category to operate said central system to transfer information between a predetermined position in said local store and the selected channel either after the same information has first been transferred from said main store to said local store in response to a different demand or before the same information is moved from the local store to the main store in response to a later demand; said central system performing all necessary housekeeping operations during such preceding and subsequent transfers of said same information; whereby said transfer between the local store and channel units is negotiated rapidly without housekeeping or other accounting operations.

15. In a data processing system including a central processor having a main store and a local buffer store accessible in shorter periods of time than said main store, and also having a plurality of channel units communicating with said main store, the combination of:

means individual to said channel units for selectively producing demand signals in a plurality of different categories having a predetermined order of priority;

first common control means conditionally operable to select a demand signal in the category of instantaneous highest priority;

second common control means responsive to said selected demand signal for selecting a transfer route from among the plurality of routes represented by a direct path between said main store and channel unit, a first indirect path segment between the main store and local store, and a second indirect path segment between the local store and channel units which is more rapidly traversable than either of the other two paths; and third common control means operable in response to said second common control means for directing the ordinary sequence controls of said central system to transfer a unit of information over the selected route, said last mentioned means being operable whenever the said selected route is either the said first path segment or direct path to direct the said sequence controls to do a housekeeping routine requisite to the performance of all housekeeping functions associated with maintaining an account of the transfer transactions completed over the selected route;

said last mentioned means being further operable whenever the said selected route is the said second path segment to direct the said ordinary sequence controls of the said central system to refrain from exercising any housekeeping functions which might slow up or otherwise interfere with the processing of information over that route segment.

16. In a data processing system including a central data processing station and a plurality of channel units linked to said station, a variable priority selection system comprising:

means individual to said channel units for selectively producing transfer demand signals in a plurality of different precedence categories; each demand signal being accompanied by either a READ or a WRITE control signal indicating the direction of information transfer associated with the said demand signal, a READ signal indicating a call for transfer towards the said central station and a WRITE signal indicating the need for a transfer from said central system in the direction of the said channel units;

said central unit including a main store accessible in a characteristic access cycle of a first predetermined duration and a local buffer store accessible in a characteristic cycle of a second predetermined duration less than said first duration;

first common control means for indicating when more than one channel have coincident active demands;

second control means for indicating when a plurality of said channel units are simultaneously in use, irrespective of whether they have coincident demands;

third common control means responsive to said demands of said channel units and to said first common control means for selecting a demand of highest instantaneous precedence category for the attention of said central system, said third common control means being operable to suppress highest category READ demands of any one channel when demands of all other channels are inactive, said highest precedence category READ demands being invariably accompanied by a lower precedence category READ demand from the same channel;

said channel units each having at least one internal buffer register;

each demand signal producing means being conditioned by said in use indicating means to be able to produce demand signals while WRITE transfers are being negotiated, if the said local buffer store is vacant, regardless of whether the said internal buffer registers of said channel are occupied with information;

fourth common control means responsive to said third common control means when a READ signal of a first lowest precedence category is selected to selectively transfer information to said main store from either the channel unit associated with the selected demand signal or the local store buffer register position associated with the selected channel;

fifth common control means responsive to selection of a READ demand signal of a predetermined highest precedence category to transfer information from the selected channel unit to the said local store buffer register position; and sixth common control means responsive to a WRITE signal of lowest or intermediate precedence category to transfer information signals selectively from said main store to either said local store or the channel associated with the selected demand conditional upon a signal furnished by the associated channel which, together with the category of the selected demand, reflects the status of occupancy of the local store and internal buffer registers of the said channel, and the condition of said in use indicating means;

seventh common control means operable in response to a demand signal of highest precedence category to operate the said sequence controls of the said central system to transfer information previously entered into said local store from said local store to an internal buffer register of the channel associated with such highest precedence;

said sequence controls of said central system including means of performing housekeeping routines to maintain an account of each transfer of information between the said channel unit and the said main store; said housekeeping functions being performed only during transfers relative to said main store and not for transfers between the said local store and internal buffer registers of said channel units, whereby said transfers between said local store and said channel buffers are accomplished in considerably less time than transfers relative to said main store.

17. In a data processing system including plural channel units for exchanging information with an internal main store of a central processing system; each channel unit including a chain of buffer registers for collecting information asynchronously at respective end registers from said central main store and an external input device and for dispensing collected information at the same end registers respectively to an external output device and said main store; the combination of:

a fast access local buffer store in said central system;

means integral with the controls of said central system for controlling slow transfers of information over two distinct paths, a first path between said main store and channel units and a second path between said main store and local store, and also for controlling stransfers over a third path between said local store and channel units;

means individual to each channel unit for maintaining status indications representing the condition of vacancy of the internal buffer registers in the associated channel's chain of buffer registers;

means individual to each channel unit for indicating the status of use of other channel units;

means individual to each channel unit for maintaining a status indication representing the condition of vacancy of a register location in said local store assigned to handle transfers of information between said local store and the associated channel;

transfer demand signalling means individual to each channel unit for issuing a plurality of different transfer demand signals representing requests for transfers of information respectively over different ones of said first, second, and third transfer paths in one of two directions denoted respectively READ and WRITE;

means individual to each channel unit for periodically sampling said use and vacancy status indications to condition the associated demand signalling means without alteration of existing demand signals, to thereby conditionally establish additional transfer demand signals while existing demand signals are pending, as a logical function of the said use and vacancy conditions; said sampling means having lookahead capability to sense anticipated vacancy and occupancy status conditions, in addition to recognizing actual vacancy and occupancy status conditions; said use status affecting the selection only of demands calling for transfers in the said WRITE direction, which represents the direction of information moving towards a channel unit from the central system;

priority selection control means in said central system for selecting demands of said channel units in a predetermined order of priority; highest priority being assigned to demands for transfers over said third path between said local store and channel units, and lesser priorities being assigned to demands for other transfers over said first and second paths;

means in said central system responsive to coincident transfer demands from at least two of said channel units to permit READ transfer demands of highest priority level, calling for transfers over said third path from local store to channels, to reach said priority selection means, and otherwise operative to suppress such demands;

said transfer demand signalling means being invariably conditioned, when calling for a READ transfer of highest priority level to also call for a READ transfer of the same information over said first path by means of a lower priority signal;

conditionally operable route selection means co-operative with said priority selection control means to operate said central transfer control means to selectively transfer information relative to the channel associated with a selected highest priority demand over a path designated by said demand; and means integral with the sequence controls of said central system for conditioning said route selection control means for a said selection whenever said central sequence controls are in other than certain predetermined control states; said certain control states being states associated with elemental transfer actions relative to said main store as a consequence of which the sequence of said central controls cannot be conveniently interrupted and subsequently restored.

References Cited

UNITED STATES PATENTS 3,333,252 7/1967 Shimabukuro ------ 340—172.5

PAUL J. HENON, *Primary Examiner.*

R. B. ZACHE, *Assistant Examiner.*